(12) United States Patent
Hanamoto

(10) Patent No.: US 10,762,653 B2
(45) Date of Patent: Sep. 1, 2020

(54) GENERATION APPARATUS OF VIRTUAL VIEWPOINT IMAGE, GENERATION METHOD, AND STORAGE MEDIUM

(71) Applicant: CANON KABUSHIKI KAISHA, Tokyo (JP)

(72) Inventor: Takashi Hanamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 15/848,202

(22) Filed: Dec. 20, 2017

(65) Prior Publication Data

US 2018/0182114 A1 Jun. 28, 2018

(30) Foreign Application Priority Data

Dec. 27, 2016 (JP) .................................. 2016-253280
Oct. 23, 2017 (JP) .................................. 2017-204420

(51) Int. Cl.
*G06T 15/00* (2011.01)
*G06T 7/55* (2017.01)
*H04N 5/247* (2006.01)
*G06T 7/60* (2017.01)
*G06T 3/00* (2006.01)
*H04N 5/222* (2006.01)

(52) U.S. Cl.
CPC ............. *G06T 7/55* (2017.01); *G06T 3/0012* (2013.01); *G06T 7/60* (2013.01); *H04N 5/2224* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 6,389,168 | B2 * | 5/2002 | Altunbasak | ........ G06K 9/00711 382/224 |
| 8,577,120 | B1 * | 11/2013 | Koshti | .................. G06T 7/0004 250/341.8 |
| 8,692,881 | B2 * | 4/2014 | Salivar | ............. G08B 13/19643 348/143 |
| 9,001,210 | B2 * | 4/2015 | Tanaka | ..................... G08G 1/04 348/159 |

(Continued)

FOREIGN PATENT DOCUMENTS

JP 05-126546 A 5/1993

*Primary Examiner* — Anh-Tuan V Nguyen
(74) *Attorney, Agent, or Firm* — Cowan, Liebowitz & Latman, P.C.

(57) ABSTRACT

A virtual viewpoint image generation apparatus including: a first generation unit configured to generate, based on a plurality of captured images obtained by a plurality of first cameras, a first virtual viewpoint image in accordance with a position and direction of a virtual viewpoint; a determination unit configured to determine, in accordance with evaluation results of the first virtual viewpoint image, whether or not to generate a second virtual viewpoint image whose image quality is higher than that of the first virtual viewpoint image based on one or a plurality of captured images obtained by one or a plurality of second cameras; and a second generation unit configured to generate the second virtual viewpoint image whose image quality is higher than that of the first virtual viewpoint image in accordance with determination by the determination unit.

19 Claims, 19 Drawing Sheets

(56) References Cited

U.S. PATENT DOCUMENTS

| | | | |
|---|---|---|---|
| 9,076,235 B2* | 7/2015 | Abe | G06T 3/4053 |
| 2002/0061131 A1* | 5/2002 | Sawhney | G06T 15/205 |
| | | | 382/154 |
| 2003/0076413 A1* | 4/2003 | Kanade | G06T 15/20 |
| | | | 348/139 |
| 2004/0105004 A1* | 6/2004 | Rui | H04N 7/181 |
| | | | 348/159 |
| 2005/0018882 A1* | 1/2005 | Muste | G01F 1/002 |
| | | | 382/107 |
| 2006/0244826 A1* | 11/2006 | Chew | G01S 3/7865 |
| | | | 348/143 |
| 2009/0046061 A1* | 2/2009 | Denoue | G06F 3/0304 |
| | | | 345/158 |
| 2009/0046152 A1* | 2/2009 | Aman | G06K 9/3216 |
| | | | 348/157 |
| 2009/0122195 A1* | 5/2009 | van Baar | G06T 3/40 |
| | | | 348/584 |
| 2009/0256837 A1* | 10/2009 | Deb | G06T 19/003 |
| | | | 345/419 |
| 2010/0002071 A1* | 1/2010 | Ahiska | H04N 5/217 |
| | | | 348/36 |
| 2010/0020080 A1* | 1/2010 | Iwanaga | G06T 15/60 |
| | | | 345/426 |
| 2010/0123770 A1* | 5/2010 | Friel | H04N 7/15 |
| | | | 348/14.08 |
| 2010/0272368 A1* | 10/2010 | Su | G06K 9/00228 |
| | | | 382/195 |
| 2011/0037852 A1* | 2/2011 | Ebling | G06K 9/00778 |
| | | | 348/143 |
| 2011/0254927 A1* | 10/2011 | Yahata | G06T 15/20 |
| | | | 348/46 |
| 2012/0127169 A1* | 5/2012 | Barcay | G06T 15/20 |
| | | | 345/419 |
| 2012/0154522 A1* | 6/2012 | Yoo | H04N 5/232 |
| | | | 348/36 |
| 2012/0165095 A1* | 6/2012 | Sato | A63F 13/5252 |
| | | | 463/31 |
| 2013/0088597 A1* | 4/2013 | Kadoch | G06K 9/00791 |
| | | | 348/148 |
| 2013/0188070 A1* | 7/2013 | Lee | H04N 5/23219 |
| | | | 348/222.1 |
| 2013/0235086 A1* | 9/2013 | Otake | H04N 5/23293 |
| | | | 345/660 |
| 2015/0031450 A1* | 1/2015 | Matsuura | A63F 13/00 |
| | | | 463/31 |
| 2015/0146029 A1* | 5/2015 | Venkataraman | H04N 13/243 |
| | | | 348/218.1 |
| 2015/0178976 A1* | 6/2015 | Strauss | G06T 15/08 |
| | | | 345/427 |
| 2015/0187049 A1* | 7/2015 | Sun | G06T 3/4007 |
| | | | 345/428 |
| 2015/0237269 A1* | 8/2015 | Hesch | H04N 5/2628 |
| | | | 348/218.1 |
| 2015/0371376 A1* | 12/2015 | Adachi | H04N 5/23219 |
| | | | 348/140 |
| 2017/0085764 A1* | 3/2017 | Kim | H04N 5/2258 |
| 2017/0147174 A1* | 5/2017 | Olejniczak | G06F 3/04817 |
| 2017/0244991 A1* | 8/2017 | Aggarwal | H04N 21/23805 |
| 2017/0252925 A1* | 9/2017 | Cho | B25J 9/1666 |
| 2017/0262994 A1* | 9/2017 | Kudriashov | G06K 9/00281 |
| 2017/0324899 A1* | 11/2017 | Ohba | H04N 5/2252 |

\* cited by examiner

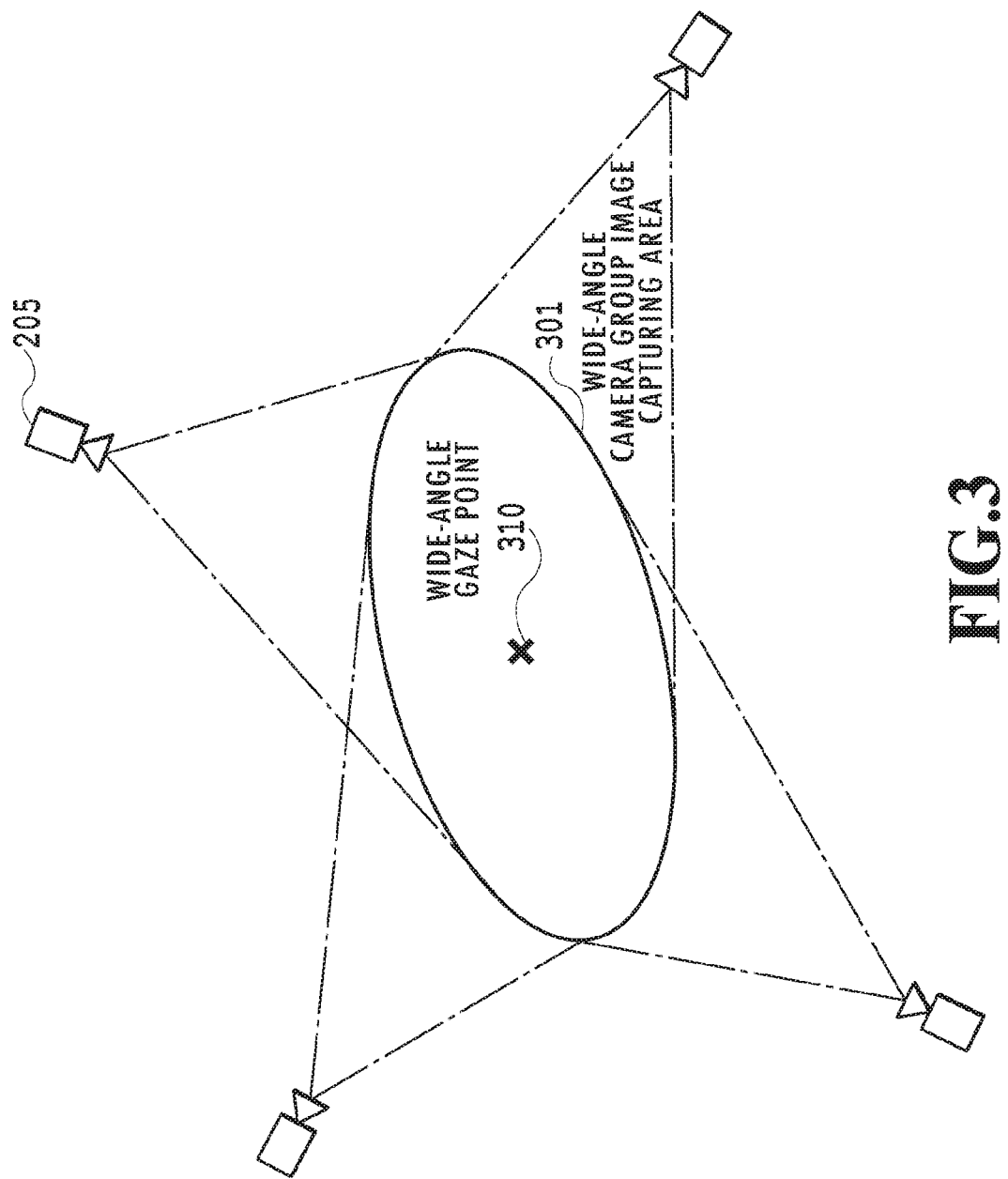

US 10,762,653 B2

GENERATION APPARATUS OF VIRTUAL VIEWPOINT IMAGE, GENERATION METHOD, AND STORAGE MEDIUM

BACKGROUND OF THE INVENTION

Field of the Invention

The present invention relates to image processing to generate a virtual viewpoint image from multi-viewpoint video images.

Description of the Related Art

As a technique to reproduce video images from a camera (virtual camera) that does not actually exist, which is arranged virtually in a three-dimensional space, by using video images captured by a plurality of real cameras, there is a virtual viewpoint image technique. The virtual viewpoint image technique is expected as video images representation giving a high feeling of being at a live performance in the sports broadcast and the like. In generation of a virtual viewpoint image, video images captured by real cameras are taken into an image processing apparatus and first, shape estimation of an object is performed. Next, based on the results of the shape estimation, a user determines a movement path of a virtual camera and video images captured from the virtual camera are reproduced. Here, for example, in the case where the image capturing scene is a soccer match, at the time of determining the movement path of a virtual camera, it is necessary for the shape estimation of players and ball to have been performed, which are objects, in the entire field where the soccer is played. However, in the case where object shape estimation processing is performed for the entire wide field, an increase in the transfer time of the multi-viewpoint video images data captured by real cameras and in the shape estimation processing time will result. In order to implement more impressive broadcast of a match with a high feeling of being at a live performance, it is important to broadcast a virtual viewpoint image of, for example, a shoot scene timely as replay video images during the match. The increase in the video images transfer time and in the shape estimation processing time will form a bottleneck in generation of a virtual viewpoint image with a high real-time performance.

Regarding this point, a technique has been proposed, which reduces the processing time by storing video images data captured by real cameras with different resolutions, performing shape estimation by video images with a low resolution first, then performing shape estimation by video images with a high resolution by using the results as an initial value, and by repeating the processing (Japanese Patent Laid-Open No. H05-126546(1993)).

However, with the technique of Japanese Patent Laid-Open No. H05-126546 (1993) described above, it is possible to reduce the shape estimation processing time, but it is not possible to reduce the time required to transfer the multi-viewpoint video images data captured by real cameras to the image processing apparatus.

SUMMARY OF THE INVENTION

The virtual viewpoint image generation apparatus according to the present invention includes: a first generation unit configured to generate, based on a plurality of captured images, obtained by a plurality of first cameras capturing images of a field from directions different from one another, a first virtual viewpoint image in accordance with a position and direction of a virtual viewpoint; a determination unit configured to determine, in accordance with evaluation results of the first virtual viewpoint image generated by the first generation unit, whether or not to generate a second virtual viewpoint image whose image quality is higher than that of the first virtual viewpoint image based on one or a plurality of captured images obtained by one or a plurality of second cameras capturing images of at least part of the field from directions different from one another; and a second generation unit configured to generate the second virtual viewpoint image whose image quality is higher than that of the first virtual viewpoint image in accordance with determination by the determination unit.

Further features of the present invention will become apparent from the following description of exemplary embodiments with reference to the attached drawings.

BRIEF DESCRIPTION OF THE DRAWINGS

FIG. 3 is a diagram showing an image capturing area of a wide-angle camera group;

DESCRIPTION OF THE EMBODIMENTS

In the following, embodiments of the present invention are explained with reference to the drawings. The following embodiments are not intended to limit the present invention and all the combinations of the features explained in the present embodiments are not necessarily indispensable to the solution of the present invention. Explanation is given by attaching the same symbol to the same configuration.

First Embodiment

Figure 1:
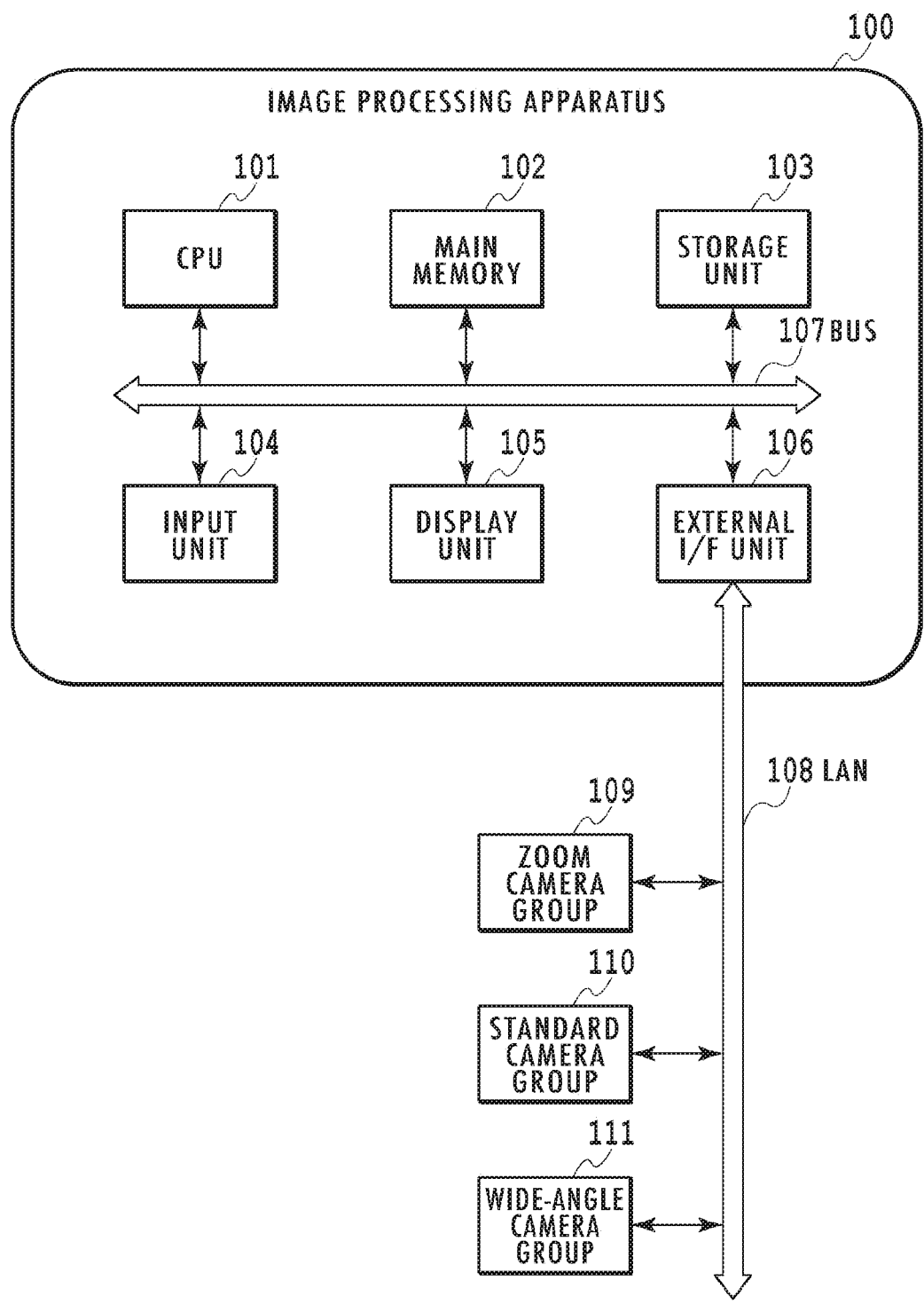
FIG. 1 is a diagram showing an example of a configuration of a virtual viewpoint image system.

FIG. 1 is a diagram showing an example of a configuration of a virtual viewpoint image system in the present embodiment. The virtual viewpoint image is image that is generated by an end user and/or an appointed operator and the like by freely operating the position and attitude of a virtual camera, and is also called a free viewpoint image, an arbitrary viewpoint image, and so on. The virtual viewpoint image may be a moving image or a stationary image. In the present embodiment, an example in the case where the virtual viewpoint image is a moving image is explained mainly. A virtual viewpoint image system shown in FIG. 1 includes an image processing apparatus 100 and three kinds of camera groups 109 to 111. Then, the image processing apparatus 100 includes a CPU 101, a main memory 102, a storage unit 103, an input unit 104, a display unit 105, and an external I/F unit 106 and each unit is connected via a bus 107. The CPU 101 is a central processing unit configured to centralizedly control the image processing apparatus 100 and performs various kinds of processing by executing various programs stored in the storage unit 103 and the like. The main memory 102 temporarily stores data, parameters, and so on, which are used in the various kinds of processing and at the same time, provides a work area to the CPU 101. The storage unit 103 is a large-capacity storage device that stores various programs and various pieces of data necessary for a GUI (Graphical User Interface) display and for example, a nonvolatile memory, such as a hard disk and a silicon disk, is used. The input unit 101 is a device, such as a keyboard, a mouse, an electronic pen, and a touch panel, and receives operation inputs from a user. The display unit 105 includes a liquid crystal panel and the like and produces a GUI display to set a path of a virtual camera at the time of virtual viewpoint image generation. The external I/F unit 106 is connected with each camera making up the camera groups 109 to 111 via a LAN 108 and performs transmission and reception of video images data and control signal data. The bus 107 connects each unit described above and transfers data.

The above-described three kinds of camera groups are the zoom camera group 109, the standard camera group 110, and the wide-angle camera group 111, respectively. The zoom camera group 109 includes a plurality of cameras each mounting a lens whose angle of view is narrow (for example, 10 degrees). The standard camera group 110 includes a plurality of cameras each mounting a lens whose angle of view is standard (for example, 30 degrees). The wide-angle camera group 111 includes a plurality of cameras each mounting a lens whose angle of view is wide (for example, 45 degrees). Then, each camera making up the camera groups 109 to 111 is connected to the image processing apparatus 100 via the LAN 108. Each of the camera groups 109 to 111 starts and stops image capturing, changes camera settings (shutter speed, aperture stop, and so on), and transfers captured video images data based on control signals from the image processing apparatus 100.

In the system configuration, various components exist other than those described above, but they are not the main purpose of the present invention, and therefore, explanation thereof is omitted.

Figure 2A:
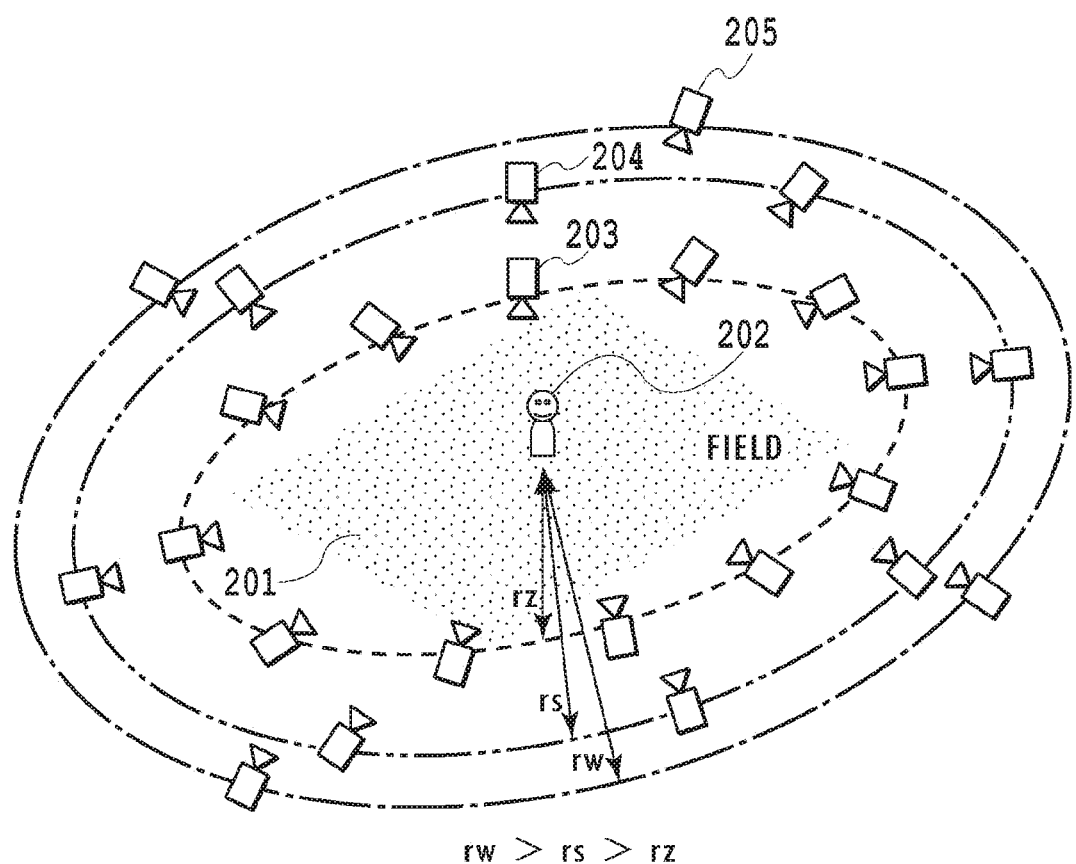
FIG. 2A is a diagram showing an example of camera arrangement and FIG. 2B is a diagram showing heights of cameras belonging to each camera group.
Figure 2B:
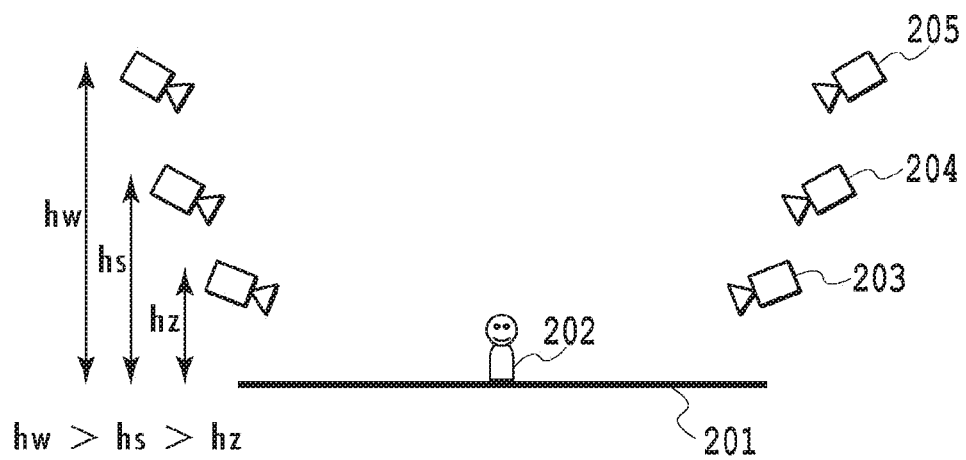

FIG. 2A is a diagram showing an example of camera arrangement in an image capturing system including the three kinds of camera groups, that is, the zoom camera group 109, the standard camera group 110, and the wide-angle camera group 11, in a sports stadium where, for example, soccer or the like is played. On a field 201 where a game is played, a player as an object 202 exists. Then, twelve zoom cameras making up the zoom camera group 109, eight standard cameras 204 making up the standard camera group 110, and four wide-angle cameras 205 making up the wide-angle camera group 111 are arranged so as to surround the field 201. The number of cameras making up each camera group satisfies a relationship of the number of zoom cameras 203>the number of standard cameras 204>the number of wide-angle cameras 205. Further, a distance rz between the zoom camera 203 and the object 202, a distance rs between the standard camera 204 and the object 202, and a distance rw between the wide-angle camera 205 and the object 202 satisfy a relationship of rw>rs>rz. The reason is to enable the standard camera 204 and the wide-angle camera 205 to capture an image of a wider area. FIG. 2B is a diagram showing heights of the zoom camera 203, the standard camera 204, and the wide-angle camera 205 from the field 201. A height hz of the zoom camera 203, a height hs of the standard camera 204, and a height hw of the wide-angle camera 205 satisfy a relationship of hw>hs>hz. The reason is also that the standard camera 204 and the wide-angle camera 205 capture an image of a wider area.

Figure 4:
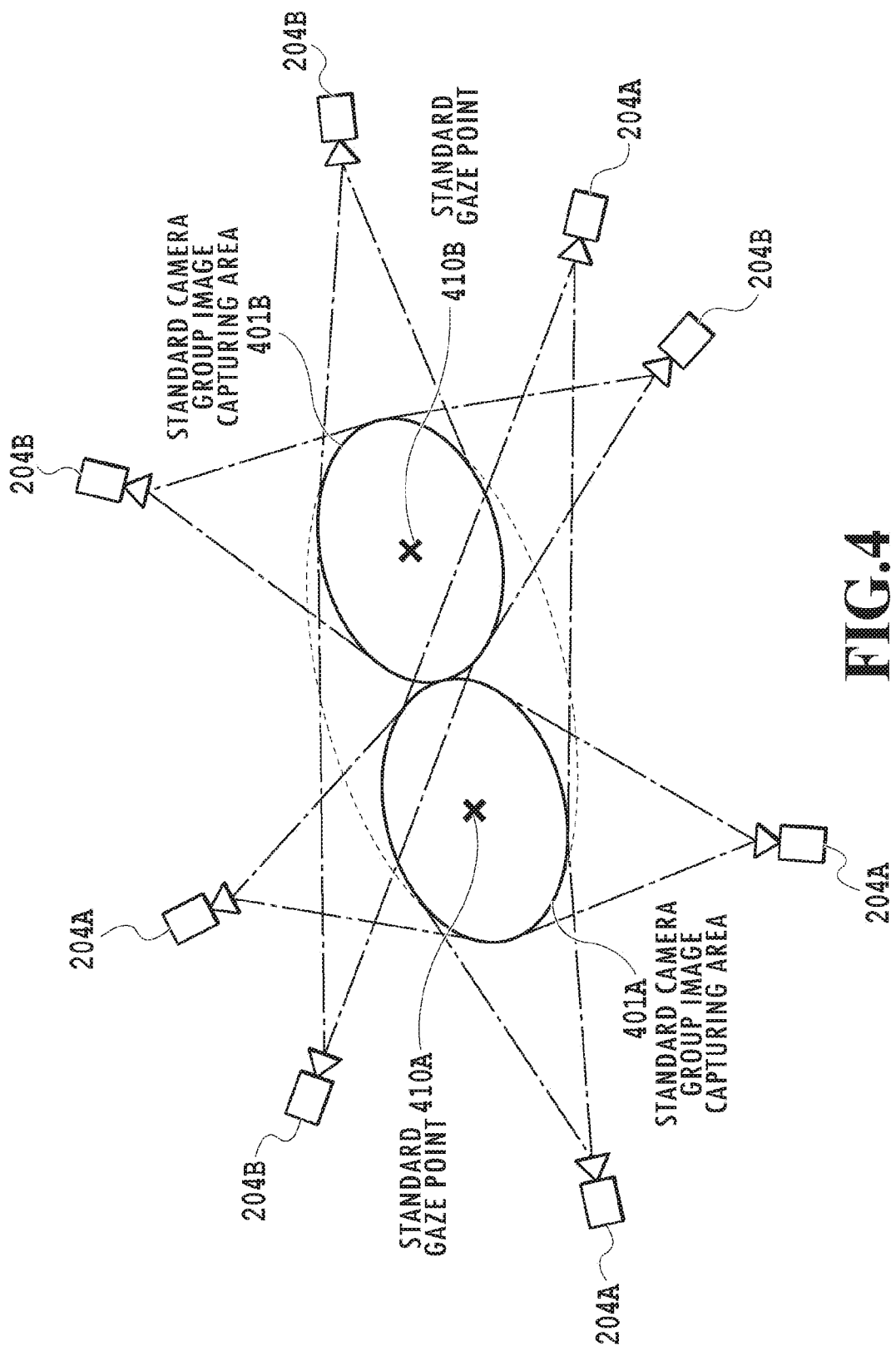
FIG. 4 is a diagram showing an image capturing area of a standard camera group.
Figure 5:
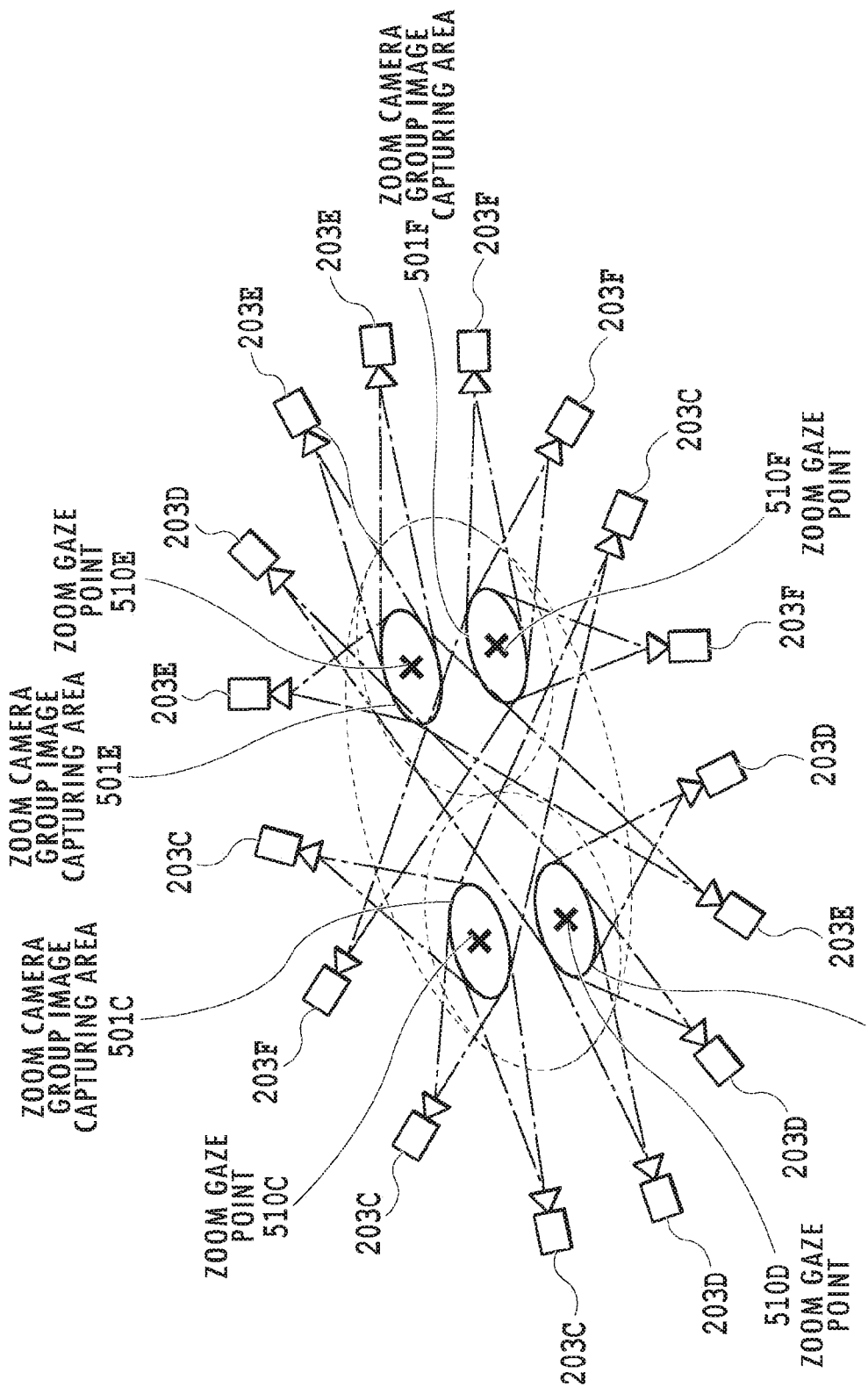
FIG. 5 is a diagram showing an image capturing area of a zoom camera group.

FIG. 3 to FIG. 5 are each a diagram showing an image capturing area of each of the camera groups 109 to 101. First, the image capturing area of the wide-angle camera group 111 is explained. As shown in FIG. 3, the four wide-angle cameras 205 making up the wide-angle camera group 111 face a wide-angle gaze point 310, which is the center of the field 201, and are arranged at equal intervals so as to cover the entire field 201 within the angle of view. At this time, the area where the image capturing areas of the four wide-angle cameras 205 overlap is taken to be a wide-angle camera group image capturing area 301 and within the area 301, it is made possible to perform shape estimation of the object 202 using multi-viewpoint video images data captured by the four wide-angle cameras 205. In the present embodiment, an example in the case where each camera is arranged at equal intervals is explained mainly, but this is not limited. In particular, there is a case where the camera arrangement is determined by taking into consideration various circumstances, such as the shape of the stadium.

Next, the image capturing area of the standard camera group 110 is explained. As shown in FIG. 4, the eight standard cameras 204 making up the standard camera group 110 are further classified into two groups A and B and the group A is made up of four standard cameras 204A and the group B is made up of four standard cameras 204B. The standard camera 204A in the group A faces a standard gaze point 410A and is designed so as to cover a specific portion (left half) of the field 201 within the angle of view. The standard camera 204B in the group B faces a standard gaze point 410B and is designed so as to cover a specific portion (right half) of the field 201 within the angle of view. As shown in FIG. 4, the standard cameras 204A or 204B belonging to each group are arranged densely in the direction in which the probability of capturing, for example, an image of the front side of a player is high, and arranged sparsely in the other directions (for example, the direction in which the probability of capturing an image of the back side or the lateral side of a player is high). By setting the density of the cameras to be arranged in accordance with the characteristics of a field, a game (event), and so on, as described above, for example, even in the case where the number of cameras is small, it is possible to improve the degree of satisfaction of a user for the virtual viewpoint image. However, the standard cameras may be arranged at equal intervals. Here, the area where the image capturing areas of the four standard camera 204A belonging to the group A is taken to be a standard camera group image capturing area 401A and the area where the image capturing areas of the four standard camera 204B belonging to the group B is taken to be a standard camera group image capturing area 401B. Within the standard camera group image capturing area 401A, it is made possible to perform shape estimation of the object 202 using multi-viewpoint video images data captured by the four standard cameras 204A. Similarly, within the standard camera group image capturing area 401B, it is made possible to perform shape estimation of the object 202 using multi-viewpoint video images data captured by the four standard cameras 204B.

Next, the image capturing area of the zoom camera group 109 is explained. As shown in FIG. 5, the sixteen zoom cameras 203 making up the zoom camera group 109 are further classified into four groups C, D, E, and F. Specifically, the group C is made up of four zoom cameras 203C, the group D is made up of four zoom cameras 203D, the group E is made up of four zoom cameras 203E, and the group F is made up of four zoom cameras 203F. Then, the zoom camera 203C in the group C faces a zoom gaze point 510C and is designed so as to cover a specific portion (top-left quarter) of the field 201 within the angle of view. The zoom camera 203D in the group D faces a zoom gaze point 510D and is designed so as to cover a specific portion (bottom-left quarter) of the field 201 within the angle of view. The zoom camera 203E in the group E faces a zoom gaze point 510E and is designed so as to cover a specific portion (top-right quarter) of the field 201 within the angle of view. Then, the zoom camera 203F in the group F faces a zoom gaze point 510F and is designed so as to cover a specific portion (bottom-right quarter) of the field 201 within the angle of view. As shown in FIG. 5, the zoom cameras 203C to 203F belonging to each group are arranged densely in the direction in which the probability of capturing an image of the front side of a player is high, and arranged sparsely in the direction in which the probability of capturing an image of the back side or the lateral side of a player is high. Here, the areas where the image capturing areas of the four zoom cameras 203C, the four zoom cameras 203D, the four zoom cameras 203E, and the four zoom cameras 203F belonging to each group overlap are taken to be a zoom camera group image capturing area 501C, a zoom camera group image capturing area 501D, a zoom camera group image capturing area 501E, and a zoom camera group image capturing area 501F, respectively. Within each of the zoom camera group image capturing areas 501C to 501F, it is made possible to perform shape estimation of an object using multi-viewpoint video images data captured by each of the four zoom cameras 203C, the four zoom cameras 203D, the four zoom cameras 203E, and the four zoom cameras 203F.

The number of cameras, the position, the number of groups, the gaze point position, and so on, are shown as examples, and they are changed in accordance with an image capturing scene and the like. For example, in the present embodiment, the gaze point is the same for each group, but it may also be possible for each camera belonging to the same group to face a different gaze point at regular intervals. The interval adjustment in such a case will be explained in a second embodiment. Further, in the present embodiment, the camera system having the three kinds of camera groups, that is, the zoom camera group 109, the standard camera group 110, and the wide-angle camera group 111, is explained, but this is not limited. For example, it may also be possible to design the camera system so as to have only the two kinds of camera groups, that is, the standard camera group 110 and the wide-angle camera group 111, or to design the camera system so as to have four or more kinds of camera groups. Further, in the above, the example is shown in which the number of cameras, the image capturing range, and the height of installation are different for each camera group, but this is not limited and the number of cameras may be the same in all the camera groups, or the image capturing range of each camera may be the same, or the height of installation of each camera may be the same. Furthermore, elements other than the number of cameras, the image capturing range, and the height of installation of each camera group may be different for different camera groups. For example, it may also be possible to construct the system, so that the number of effective pixels of a plurality of cameras belonging to a first camera group is larger than the number of effective pixels of a plurality of cameras belonging to a second camera group. Still furthermore, there may be a case where the number of cameras belonging to at least one camera group is one. As described above, the configuration of the system explained in the present embodiment is merely exemplary and it is possible to make various modifications in accordance with the constraints, such as the area of the stadium, the number of cameras, the budget, and so on.

Figure 6:
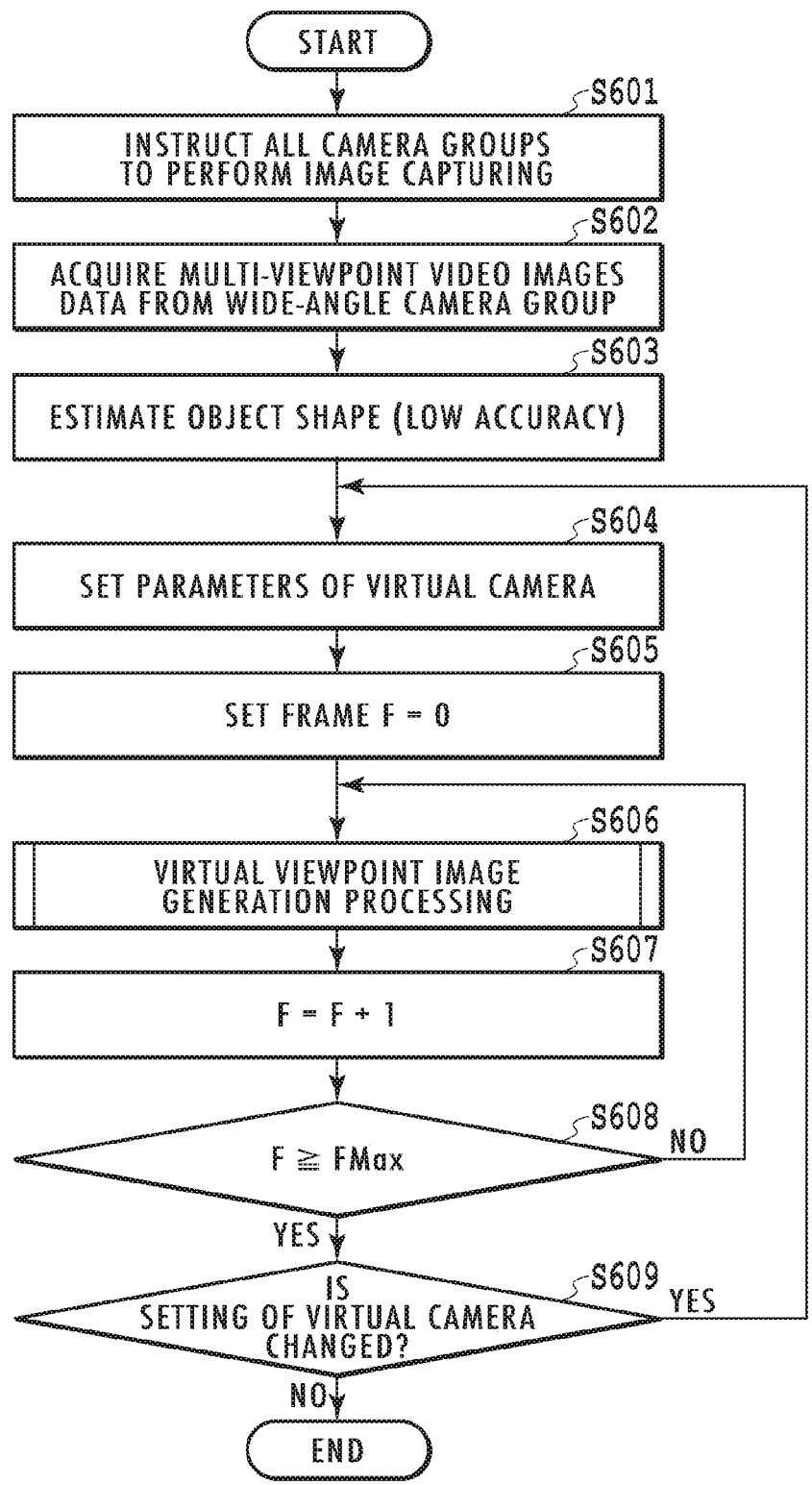
FIG. 6 is a flowchart showing an entire flow until a virtual viewpoint image is generated.

FIG. 6 is a flowchart showing an entire flow until a virtual viewpoint image is generated in the image processing apparatus 100. The series of processing is implemented by the CPU 101 reading a predetermined program from the storage unit 103, loading the program onto the main memory 102, and executing the program.

At step S601, to each of the camera groups 109 to 111, image capturing parameters, such as the exposure condition, at the time of image capturing and an image capturing start signal are transmitted. Each camera belonging to each camera group starts image capturing in accordance with the received image capturing parameters and stores the obtained video images data in the memory within each camera.

At step 602, multi-viewpoint video images data captured by all the wide-angle cameras 205 belonging to the wide-angle camera group 111 is acquired. The acquired wide-angle video images data at the multiple viewpoints (here, four viewpoints) is loaded onto the main memory 102. As described previously, the number of wide-angle cameras 205 belonging to the wide-angle camera group 111 is smaller than the number of cameras belonging to the other camera groups, and therefore, the time required to transfer the video images data from each wide-angle camera 205 may be short.

At step 603, by using the multi-viewpoint video images data acquired from the wide-angle camera group 111, estimation processing of a three-dimensional shape of an object is performed. As the estimation method, it may be possible to apply a publicly known method, such as the Visual-hull method that uses contour information on an object and the Multi-view stereo method that uses triangulation. The resolution of the object area within the video images data captured by the wide-angle camera 205 is comparatively low. Because of this, the three-dimensional shape data obtained by the shape estimation at this step is of low accuracy and coarse, but it is possible to estimate the shape of an object existing in the entire field at a high speed. The obtained object shape data is stored in the main memory 102 along with the position information thereon.

Figure 7A:
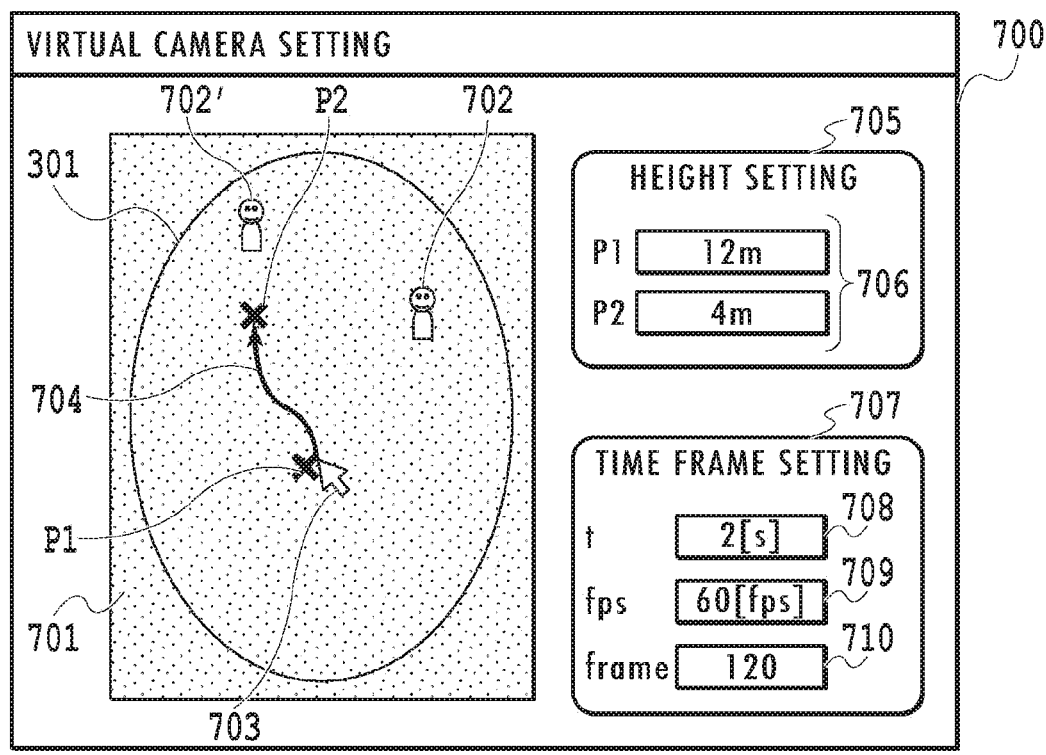
FIG. 7A and FIG. 7B are each a diagram showing an example of a parameter setting GUI screen relating to a virtual camera.
Figure 7B:
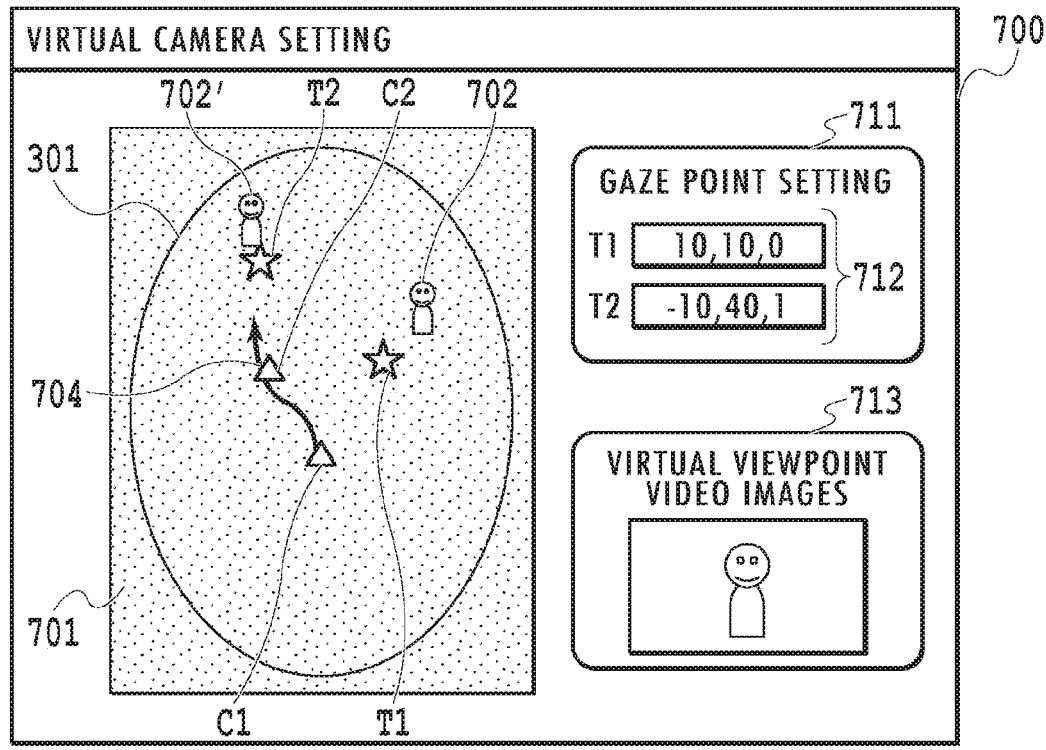

At step 604, based on the estimated object shape data of low accuracy, various parameters, such as the movement path of the virtual camera, necessary to generate virtual viewpoint video images are set. In the present embodiment, based on a user input via a GUI (Graphical User Interface), values or the like of various items are set. FIG. 7A and FIG. 7B are each a diagram showing an example of a parameter setting GUI screen relating to a virtual camera. On the left side within a GUI screen 700 shown in FIG. 7A, the wide-angle camera group image capturing area 301 is displayed on a bird's-eye view (field map 701) of the entire image capturing space including the field 201. Onto the wide-angle camera group image capturing area 301, a three-dimensional shape 702 of an object acquired at step 603 is mapped. It is possible for a user to check the position of the object 202, the direction in which the object 202 faces, and so on, by the mapped three-dimensional shape 702 of the object. It is possible for a user to specify a movement locus as a virtual camera path 704 by operating a mouse and the like to move a cursor 703 on the wide-angle camera group image capturing area 301 after pressing down a virtual camera path setting button (not shown schematically). The height of the virtual cameral path from the field 201, which is specified at this time, is a default, value (for example, 15 m). Then, after specifying the virtual camera path 704, it is possible for a user to change the height of the specified virtual camera path by pressing down a height editing button (not shown schematically). Specifically, a user specifies the position (height editing point) of the virtual camera whose altitude a user desires to change by moving the cursor 703 to an arbitrary position (coordinates) on the virtual camera path displayed on the wide-angle camera group image capturing area 301 and performing a click operation of a mouse and the like. Here, the portion indicated by the x mark within the wide-angle camera group image capturing area 301 indicates the height editing point specified by a user. It is possible to set a plurality of height editing points. In the example in FIG. 7A, two height editing points P1 and P2 are set. In the case where the height editing point is set, a height setting window 705 is displayed on the right side within the GUI screen 700. It is possible for a user to change the height of the virtual camera at the position by inputting an arbitrary value (unit: m) to an input field 706 corresponding to each editing point within the height setting window 705. In this case, the heights other than that at the portion at which the altitude is changed by the height editing point are adjusted so as not to change abruptly by interpolating the height from the height editing point at the position in the vicinity thereof or from the default value. A user having specified the virtual camera path next sets the time (moving speed) required for the virtual camera to pass through the virtual camera path by pressing down a time frame setting button (not shown schematically). Specifically, in response to the time frame setting button being pressed down, on the right side within the GUI screen 700, a time frame setting window 707 is displayed and the time taken for movement is input to an input field (item: t) and each value of the frame rate is input to an input field (item: fps). In the case where the time and the frame rate are input, the number of frames of virtual viewpoint image to be generated is calculated and displayed in a display field 710 (item: frame). In the example in FIG. 7A, the time input to the input field 708 is 2 [s] and the frame rate input to the input field 709 is 60 [fps], and therefore, images (hereinafter, virtual viewpoint image) viewed from virtual viewpoints corresponding to 120 frames are generated as a result. The number of frames calculated at this time is stored on the main memory 102 as "F_Max". Further, in order to determine the direction in which the virtual camera faces on the specified virtual camera path, a user sets the gaze point position of the virtual camera by pressing down a gaze point setting button (not shown schematically). Specifically, a user specifies the virtual camera position (gaze point setting point) for which the gaze point is to be set by moving the cursor 703 to an arbitrary position (coordinates) on the virtual camera path displayed within the wide-angle camera group image capturing area 301 and performing a click operation of the mouse and the like. Like the height editing point, it is also possible to set a plurality of gaze point setting points. In the case where the gaze point setting point is set, the position of the gaze point at the current point in time at which a pair is made therewith is displayed automatically. The gaze point position at this time is the position of the object of interest determined in advance, for example, such as a player carrying a ball. In FIG. 7B, the portion indicated by the Δ mark is the gaze point setting point (virtual camera position) specified by a user and the portion indicated by the ☆ mark is the corresponding gaze point position. In the example in FIG. 7B, two gaze point setting points C1 and C2 are set and as the gaze point corresponding to C1, T1 is displayed and as the gaze point corresponding to C2, T2 is displayed. In the case where the gaze point setting point is set, a gaze point setting window 711 is displayed on the right side within the GUI screen 700. It is possible for a user to change the position at which the virtual camera at the gaze point setting point gazes by inputting arbitrary coordinates (x, y, z) to an input field 712 corresponding to each setting point within the gaze point setting window 711. Then, the gaze points other than that at the portion at which the gaze point is changed are adjusted so as not to change abruptly by interpolating the gaze point from the gaze point setting point at the position in the vicinity thereof or from the default gaze point. As above, the parameters relating to the virtual camera are set.

At step 605, in order to generate virtual viewpoint images corresponding to the number of frames set at step 604, a storage area of a variable F is secured in the main memory 102 and "0" is set as an initial value. Then, at step 606 that follows, the virtual viewpoint image of the Fth frame is generated in accordance with the set virtual camera parameters. Details of virtual viewpoint image generation processing will be described later in detail.

At step 607, the value of the variable F is incremented (+1). Then, at step 608, whether or not the value of the variable F is larger than the above-described F_Max is determined. In the case where the results of the determination indicate that the value of the variable F is larger than F_Max, this means that the virtual viewpoint images corresponding to the set number of frames have been generated (that is, completion of the virtual viewpoint images corresponding to the set time frame), and the processing advances to step 609. On the other hand, in the case where the value of the variable F is smaller than or equal to F_Max, the processing returns to step 606 and the virtual viewpoint image generation processing of the next frame is performed.

At step 609, whether to generate a new virtual viewpoint image by changing the setting of the virtual camera parameters is determined. This processing is performed based on instructions from a user who has viewed the virtual viewpoint image displayed in a preview window 713 that is displayed by pressing down a preview button (not shown schematically) and checked the image quality and the like thereof. In the case where a user desires to generate a virtual viewpoint image again, the user presses down the virtual camera path setting button and the like again and performs parameter setting relating to the virtual camera again (the processing returns to step 604). Then, a virtual viewpoint image is generated with contents in accordance with the virtual camera parameters set newly. On the other hand, in the case where the generated virtual viewpoint image is not problematic, the present processing is terminated. The above is a rough flow until a virtual viewpoint image is generated according to the present embodiment.

Figure 8:
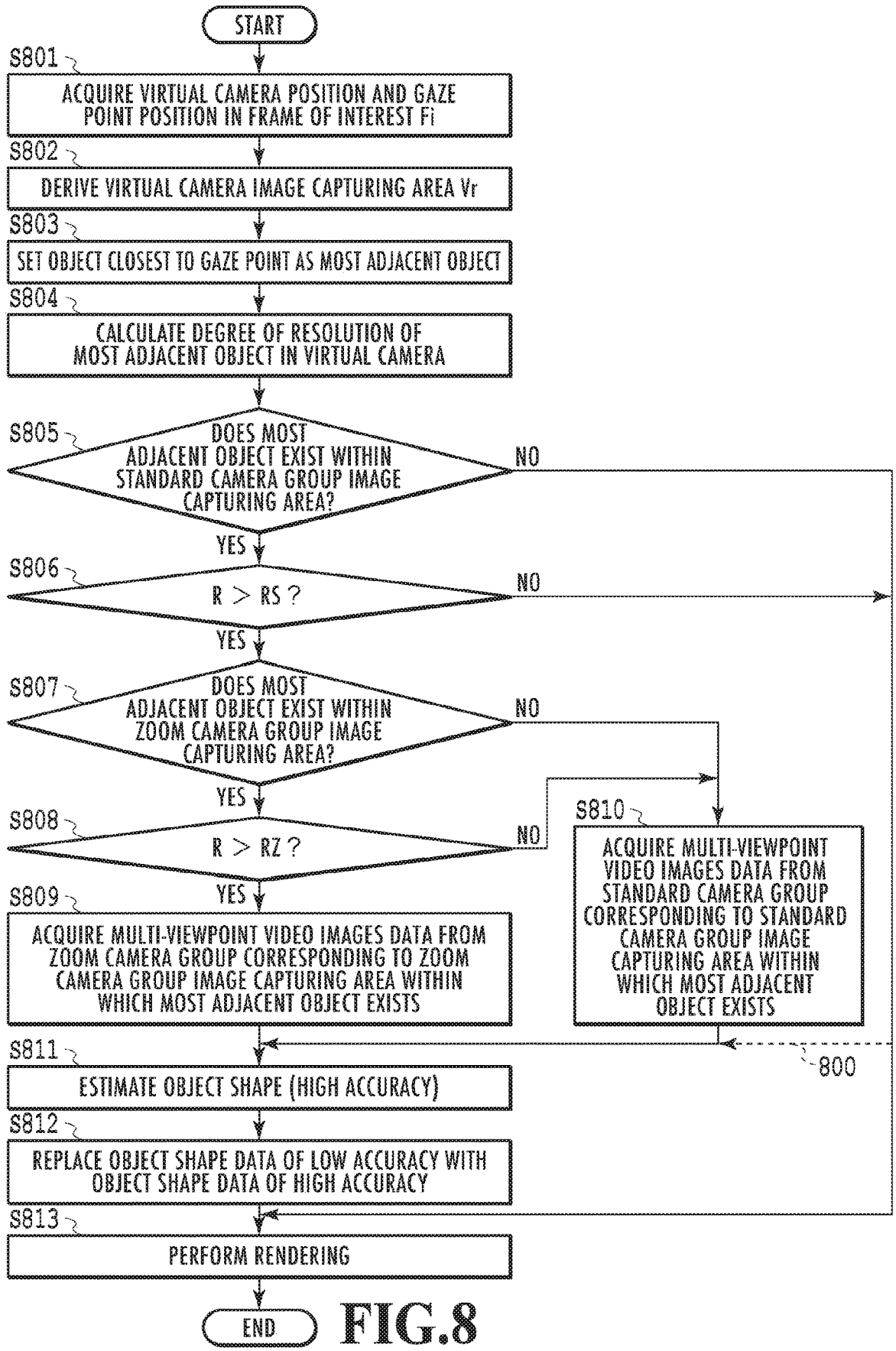
FIG. 8 is a flowchart showing details of virtual viewpoint image generation processing according to a first embodiment.

Following the above, the virtual viewpoint image generation processing at step 606 described previously is explained in detail. FIG. 8 is a flowchart showing details of the virtual viewpoint image generation processing according to the present embodiment. In the following, detailed explanation is given along the flow in FIG. 8.

Figure 9:
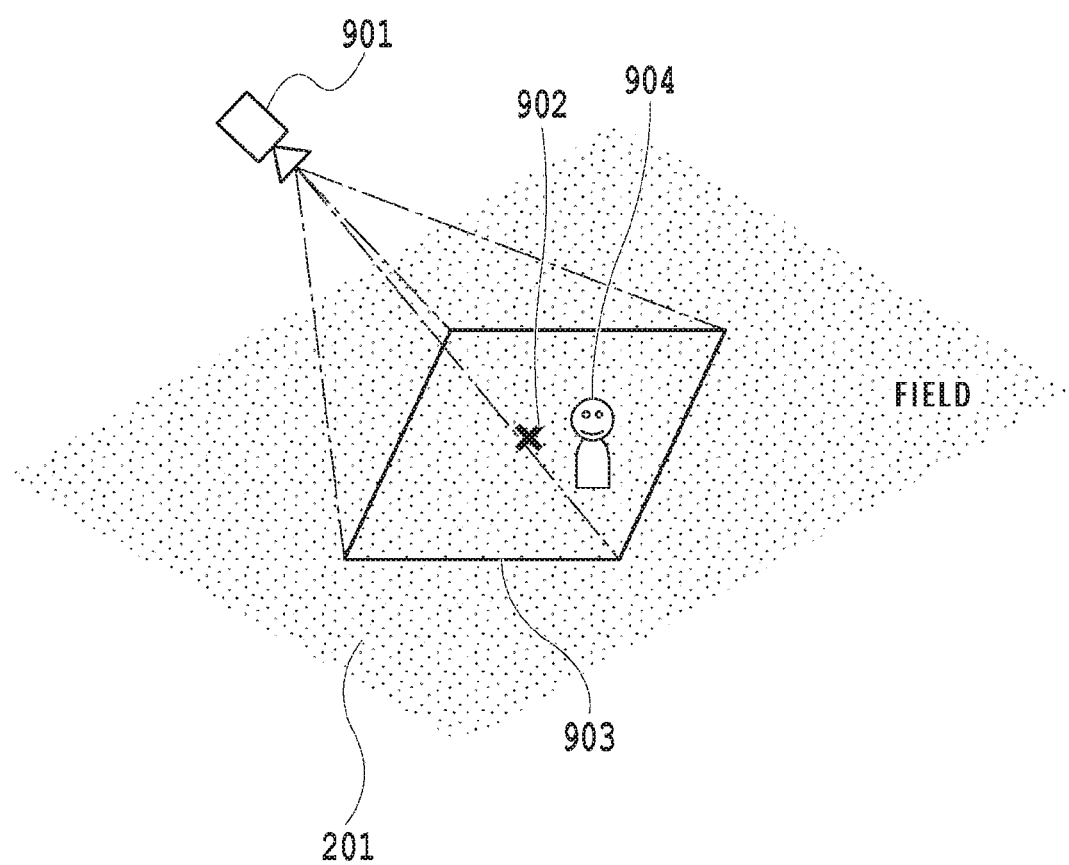
FIG. 9 is a diagram explaining a derivation method of as image capturing area of a virtual camera.

At step 801, based on the virtual camera path set at step 605 described previously, the virtual camera position and the gaze point position in a processing-target frame of interest Fi are acquired, respectively. At step 802 that follows, from the acquired virtual camera position and gaze point position, a virtual camera image capturing area Vr of the frame of interest Fi is derived. FIG. 9 is a diagram explaining a derivation method of a virtual camera image capturing area. In FIG. 9, a quadrangular pyramid is formed from a virtual camera 901 toward a gaze point 902 and a rectangular area 903, which is an intersection plane of the quadrangular pyramid and the field 201, is the virtual camera image capturing area Vr. Then, at step 803, the object closest to the gaze point position acquired at step 801 is detected and set as the most adjacent object. In FIG. 9, symbol 904 indicates the most adjacent object.

At step 804, a degree of resolution of the most adjacent object in the set virtual camera is calculated. Specifically, a ratio R of the area occupied by the most adjacent object in a temporary virtual viewpoint image (a virtual viewpoint image based on only the multi-viewpoint video images data of the wide-angle camera 205) viewed from the virtual camera of the frame of interest Fi is found. This ratio R is a value obtained by dividing the number of pixels in the most adjacent object area in the above-described temporary virtual viewpoint image by the total number of pixels of the entire image, and for example, the radio R takes a value in a range between 0 and 1, such as 0.3. In the present embodiment, an example is explained mainly in which a temporary virtual viewpoint image is evaluated based on the degree of resolution of the most adjacent object, but it may also be possible to evaluate the degree of resolution of another object in addition to the most adjacent object, or in place of the most adjacent object. As an example of another object, mention is made of, for example, an object selected by a viewer (for example, a specific player), an object closest to the center of a temporary virtual viewpoint image, an object who faces forward (in the case where a plurality of objects exists, the object closest to the virtual camera), and so on. The number of objects referred to for evaluation of a temporary virtual viewpoint image is not limited to one and there may be a plurality of objects.

At step 805, whether the most adjacent object exists within the standard camera group image capturing area is determined based on each of the position coordinates. In this case, as the position information on the most adjacent object, the position information derived at step 603 described previously and stored in the RAM main memory 102 is used and as the position information on the standard camera group image capturing area, the position information stored in advance in the storage unit 103 is used. In the case where the most adjacent object exists within the standard camera group image capturing area, the processing advances to step 806. On the other hand, in the case where the most adjacent object does not exist, the processing advances to step 813 and rendering using the object shape data of low accuracy based on the multi-viewpoint video images data of the wide-angle camera group is performed. In the case of the present embodiment, on a condition that the most adjacent object is included in one of the standard camera group image capturing areas A and B, the processing advances to step 806 as a result.

Figure 10A:
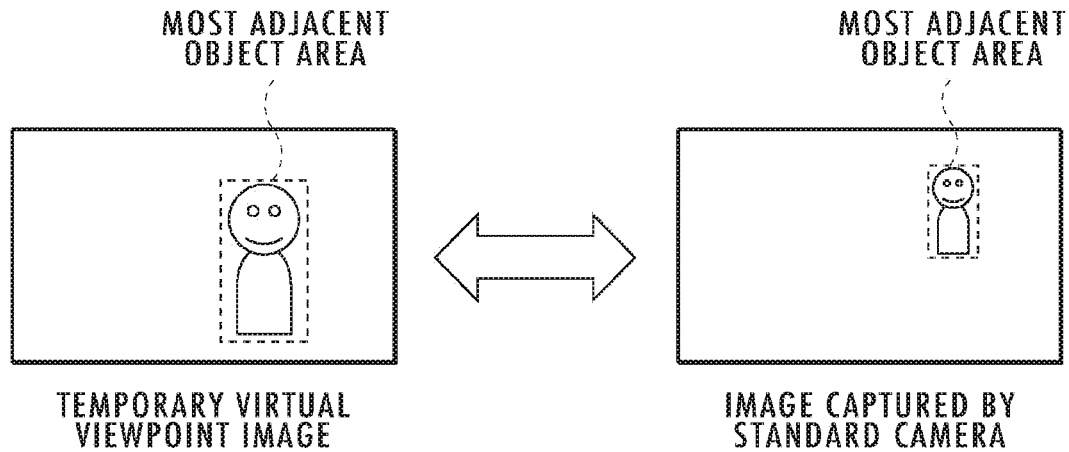
FIG. 10A and FIG. 10B are each an explanatory diagram of determination of a degree of resolution of a most adjacent object in a temporary virtual viewpoint image.

At step 806, whether the ratio R indicating the degree of resolution of the most adjacent object in the temporary virtual viewpoint image is larger than a first threshold value Rs is determined. Here, the first threshold value Rs is obtained by acquiring the captured image of one of the standard cameras 204 belonging to the standard camera group, the image capturing area of which is determined to include the most adjacent object, and by dividing the number of pixels in the above-described most adjacent object area in the captured image by the total number of pixels thereof. Due to this, it is made possible to compare the degree of resolution of the most adjacent object between the virtual camera of the frame of interest Fi and the standard camera. FIG. 10A is diagram visually representing the determination contents at this step and in this case, it is determined that the degree of resolution of the most adjacent object in the temporary virtual viewpoint image is higher (the value of the ratio R is larger). In the case where the results of the determination indicate that the value of the calculated ratio R is larger than the threshold value Rs, the processing advances to step 807. On the other hand, in the case where the value of the calculated ratio R is smaller than or equal to the threshold value Rs, the processing advances to step 813 and rendering using the object shape data of low accuracy generated based on the multi-viewpoint video images data of the wide-angle camera group is performed. As the determination method at step 806, there exist various modification examples. For example, it may also be possible to design the flow so that the processing advances to step 807 in the case where the ratio R is larger the threshold value Rs by a predetermined threshold value or more and the processing advances to step 813 in the other cases.

At step 807, as at step 805 described above, whether the most adjacent object exists within the zoom camera group image capturing area is determined based on each of the position coordinates. In this case, the position information on the zoom camera group image capturing area is also stored in advance in the storage unit 103. In the case where the most adjacent object exists within the zoom camera group image capturing area, the processing advances to step 808 and in the case where the most adjacent object does not exist, the processing advances to step 810. In the case of the present embodiment, on a condition that the most adjacent object is included in one of the zoom camera group image capturing areas C to F, the processing advances to step 808 as a result.

Figure 10B:
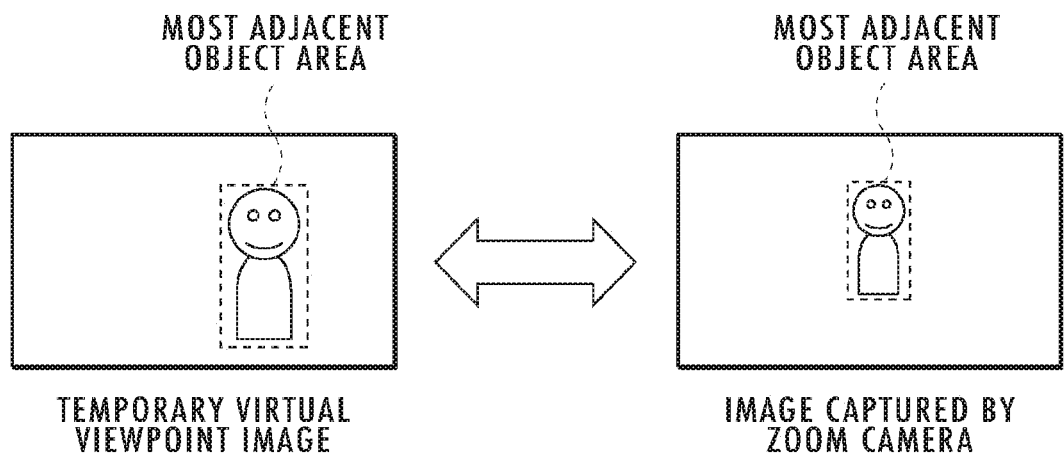

At step 808, whether the ratio R indicating the degree of resolution of the most adjacent object in the temporary virtual viewpoint image is larger than a second threshold value Rz is determined. Here, the second threshold value Rz is obtained by acquiring the captured image of one of the zoom cameras 203 belonging to the zoom camera group, the image capturing area of which is determined to include the most adjacent object, and by dividing the number of pixels in the most adjacent object area in the captured image by the total number of pixels thereof. Due to this, it is made possible to compare the degree of resolution of the most adjacent object between the virtual camera of the frame of interest Fi and the zoom camera. FIG. 10B is a diagram visually representing the determination contents at this step and here also, it is determined that the degree of resolution of the most adjacent object in the temporary virtual viewpoint image is higher (the value of the ratio R is larger). In the case where the results of the determination indicate that the value of the calculated ratio R is larger than the threshold value Rz, the processing advances to step 809. On the other hand, in the case where the value of the calculated ratio R is smaller than or equal to the threshold value Rz, the processing advances to step 810.

At step 809, the multi-viewpoint video images data used for the estimation (reestimation) of high accuracy of the object shape in the virtual camera image capturing area Vr of the frame of interest Fi is acquired from the zoom camera group corresponding to the zoom camera group image capturing area for which it is determined that the most adjacent object exits. The acquired multi-viewpoint video images data is loaded onto the main memory 102. Further, at step 810, the multi-viewpoint video images data used for the reestimation (high accuracy) of the object shape in the virtual camera image capturing area Vr of the frame of interest Fi is acquired from the standard camera group corresponding to the standard camera group image capturing area for which it is determined that the most adjacent object exits. The acquired multi-viewpoint video images data is loaded onto the main memory 102.

At step 811, by using the multi-viewpoint video images data loaded onto the main memory 102, the reestimation processing of the object shape is performed. Due to this, the object shape data whose accuracy is higher than that of the object shape data obtained at step 603 described previously is acquired. Then, at step 812, the object shape data of low accuracy obtained by the shape estimation at step 603 described previously is replaced with the object shape data of high accuracy obtained by the shape estimation at step 811.

At step 813, by using the object shape data determined by the processing up to step 812 and the rendering method in the computer graphics, the virtual viewpoint image, which is an image viewed from the virtual camera of the frame of interest Fi, is generated.

The above is the contents of the virtual viewpoint image generation processing according to the present embodiment. For the determination of whether to acquire the object shape data of higher accuracy by performing the reestimation of the object shape, in the present embodiment, the degree of resolution of the most adjacent object in the temporary virtual viewpoint image is used as an index, but this is not limited. For example, it may also be possible to take the distance between the most adjacent object and the virtual camera to be an index and to perform reestimation in the case where the distance between the most adjacent object and the virtual camera position is longer than the distance between the most adjacent object and the zoom camera position or between the most adjacent object and the standard camera position. Further, in the above-described embodiment, the example is explained mainly, in which whether or not to generate a virtual viewpoint image of higher image quality is determined based on the results of the comparison between the degree of resolution of the temporary virtual viewpoint image (specifically, the ratio R obtained by dividing the number of pixels of the most adjacent object by the number of total pixels of the temporary virtual viewpoint image) and the threshold value (specifically, the threshold value Rs obtained by dividing the number of pixels of the most adjacent object in the captured image obtained by the camera belonging to the standard camera group by the number of total pixels of the captured image). However, the determination method is not limited to this and there can be various modifications. For example, it may also be possible to determine to generate a virtual viewpoint image of high image quality irrespective of the threshold value Rs in the case where the area ratio R in the temporary virtual viewpoint image is larger than a predetermined threshold value (that is, the size of the object in the virtual viewpoint image is larger than a threshold value). Further, as another method, it may also be possible to evaluate the image quality of the object closest to the gaze point position (the most adjacent object) in the temporary virtual viewpoint image and to determine whether to generate a virtual viewpoint image of high image quality in accordance with the evaluation results. As the evaluation method of image quality of the most adjacent object, for example, in the case where the object is a person who faces forward, a method may be used in which evaluation is performed based on the recognition results of the face, or a method may be used in which evaluation is performed based on the degree of definition of the edge of the object. By using these determination methods, a method can be implemented, which is easier than the determination method using the captured image of the standard camera group. Other modification examples are described in the following.

Modification Example

Figure 11:
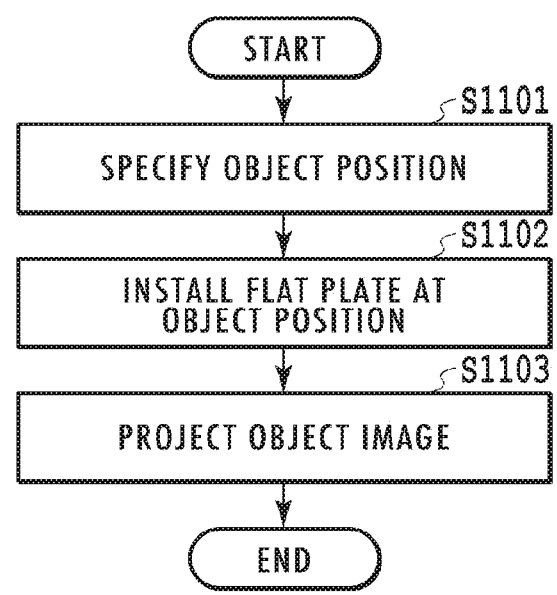
FIG. 11 is a flowchart showing a flow of shape estimation processing by a billboard method according to a modification example.

In the above-described embodiment, first, the three-dimensional shape of the object of low accuracy is acquired by using the multi-viewpoint video images data of the wide-angle camera group and after this, the three-dimensional shape of the object of high accuracy is reacquired by using the multi-viewpoint video images data of the standard or zoom camera group in accordance with the virtual camera path and the virtual viewpoint image is generated. However, this is not limited. For example, it may also be possible to perform two-dimensional shape estimation (billboard method) by regarding an object as a plane in place of the three-dimensional shape estimation of low accuracy using the multi-viewpoint video images data of the wide-angle camera group. In the case of the billboard method, at step 603 described previously, the flow shown in FIG. 11 is performed. In the following, detailed explanation is given.

Figure 12:
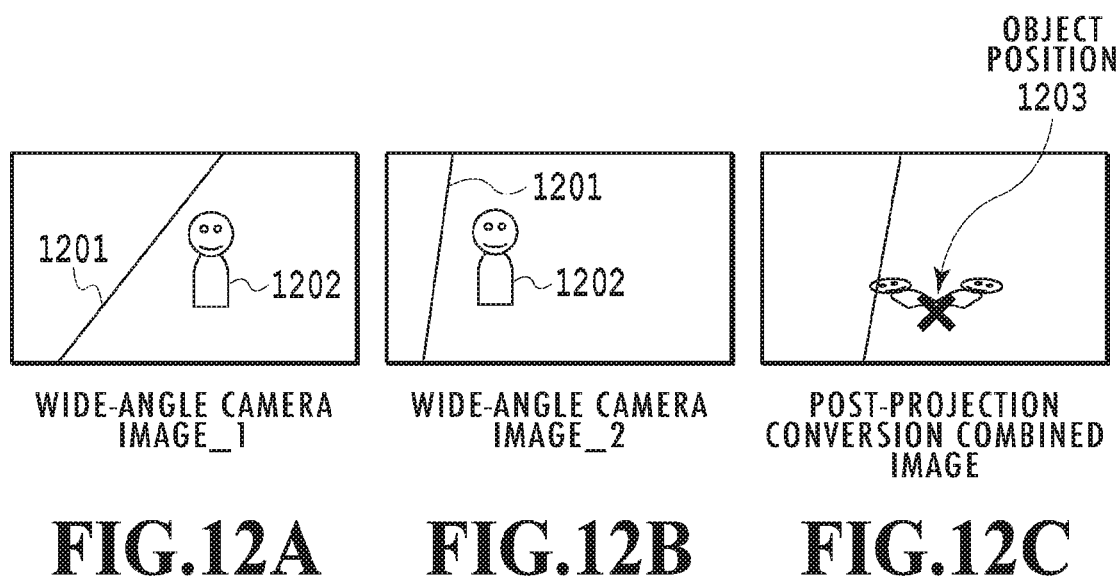
FIG. 12A to FIG. 12C are diagrams explaining an object position specification method according to a modification example.

At step 1101, the object position on the field 201 is specified. FIG. 12A to FIG. 12C are diagrams explaining the object position specification method. In FIG. 12A to FIG. 12C, a wide-angle camera image_1 in FIG. 12A and a wide-angle camera image_2 in FIG. 12B are images captured by the different wide-angle cameras 205, respectively, and one line 1201 and an object 1202 are captured in each of the images. Then, FIG. 12C is a post-projection conversion combined image obtained by combining the wide-angle camera image_1 and the wide-angle camera image_2 by performing projection conversion with the field surface as a reference. In the post-projection conversion combined image, it is known that the line 1201 remains unchanged, that is, the one line 1201 exists, but the object 1201 is separated into two. By making use of the characteristics, the position indicated by the x mark, from which the separation occurs, is specified as an object position 1203.

Figure 13:
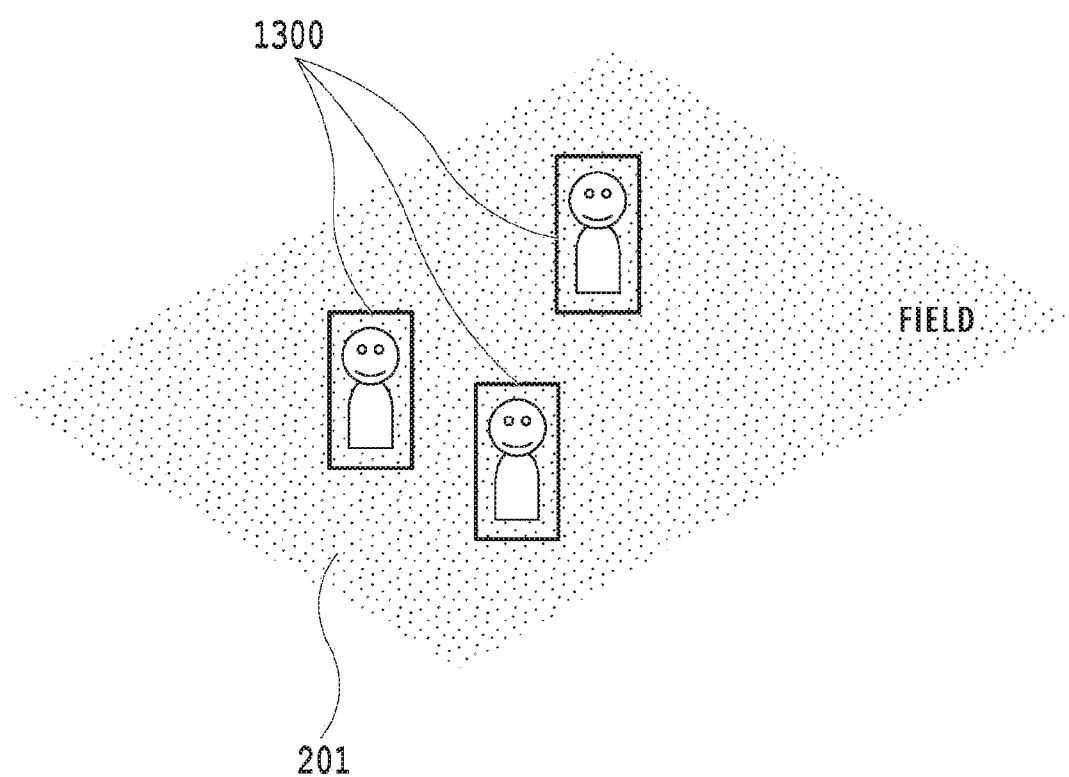
FIG. 13 is a diagram showing a state where a partial image of an object is projected onto a flat plate according to a modification example.

At step 1102, a flat plate is installed at the specified object position. Then, at step 1103 that follows, onto the installed flat plate, a partial image of the object, which is cut out from the captured image of the wide-angle camera 205, is projected. FIG. 13 is a diagram showing a state where the partial image of the object is projected onto the flat plate. It is known that the partial image of each object is projected onto each of flat plates 1300 installed in the number corresponding to the number of objects existing on the field 201.

The above is the contents of the processing according to the present modification example. The shape of an object is processed two-dimensionally, and therefore, it is possible to perform high-speed processing.

Further, it may also be possible to arrange an object shape prepared in advance (for example, an object shape modeled by a scan by a 3D range scanner, or manually) at the specified object position in place of installing the flat plate and projecting the cut-out image.

In the case of the present modification example, part of the processing in the virtual viewpoint image generation processing (step 606) is changed. That is, even in the case where the determination processing at step 805 and step 806 results in "No", the processing advances to step 811, not to the step 813, and the estimation processing of the three-dimensional shape of the object is performed. For the estimation at this time, the multi-viewpoint video images data of the wide-angle camera group, which has already been acquired at step 602, is used. A broke-line arrow 800 in the flow in FIG. 8 indicates this. In this case also, by estimating the shape of only the object included in the image capturing area Vr of the virtual camera of the frame of interest Fi, it is possible to increase the speed of the processing.

As above, according to the present embodiment, only in the case where it is possible for the virtual camera to come closer to the object of interest while maintaining the image quality, the multi-viewpoint video images data captured by the camera group whose angle of view is narrower is a acquired and the object shape estimation of high accuracy and the generation of the virtual viewpoint image are performed. Consequently, it is possible to suppress the data transfer amount and the processing load to a minimum required amount. Due to this, it is made possible to generate a virtual viewpoint image with a higher real-time performance.

Second Embodiment

Next, an aspect is explained as a second embodiment, in which it is made possible to further reduce the video images transfer time and the shape estimation processing time by optimizing the image capturing area of the camera group other than the wide-angle camera group (in the first embodiment, the zoom camera group and the standard camera group) in accordance with an image capturing scene. The system configuration, the virtual viewpoint image generation, and the rough process of the processing are the same as those of the first embodiment, and therefore, explanation thereof is omitted and in the following, different points are explained mainly and briefly.

Figure 14:
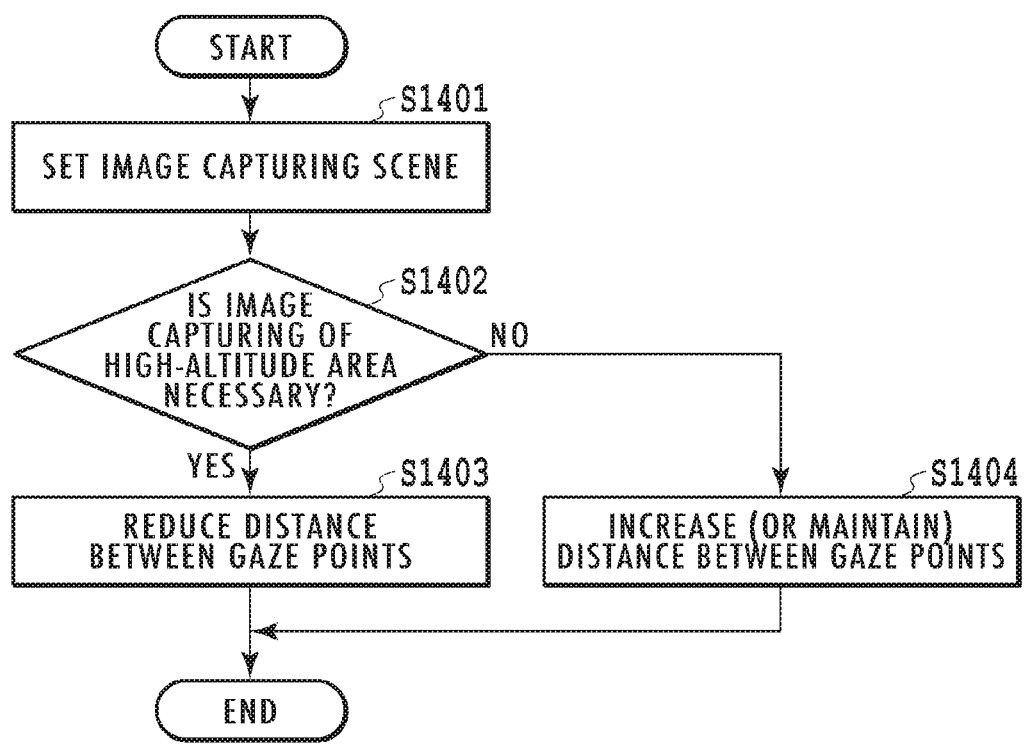
FIG. 14 is a flowchart showing a flow of processing to optimize image capturing areas of a standard camera group and a zoom camera group according to a second embodiment.

FIG. 14 is a flowchart showing a flow of processing to optimize the image capturing areas of the standard camera group and the zoom camera group according to the present embodiment. As the premise of the present embodiment, it is assumed that in the default state before the present processing is performed, the respective cameras belonging to the same group within the respective camera groups are located at regular intervals and face different, directions (the gaze points are different).

At step 1401, the setting of an image capturing scene (for example, whether the image capturing target is a ball game or athletic sports) is performed based on a user input via a UI screen, not shown schematically. At step 1402 that follows, whether or not the set image capturing scene is a scene that requires image capturing of a high-altitude area whose altitude is higher than a predetermined altitude is determined. Here, the image capturing scene that requires image capturing of a high-altitude area is a ball game, such as soccer and rugby, in which a ball reaches an altitude of about tens m. The image capturing scene that requires only image capturing of an area whose altitude is lower than a predetermined altitude and does not require image capturing of a high-altitude area (scene for which only image capturing of a low-altitude area is required) is a short-distance race and the like of the athletic sports. In the case where the results of the determination indicate that the image capturing scene is a scene that requires image capturing of a high-altitude area, the processing advances to step 1403. On the other hand, in the case where the image capturing scene is a scene that does not require image capturing of a high-altitude area, the processing advances to step 1404.

Figure 15A:
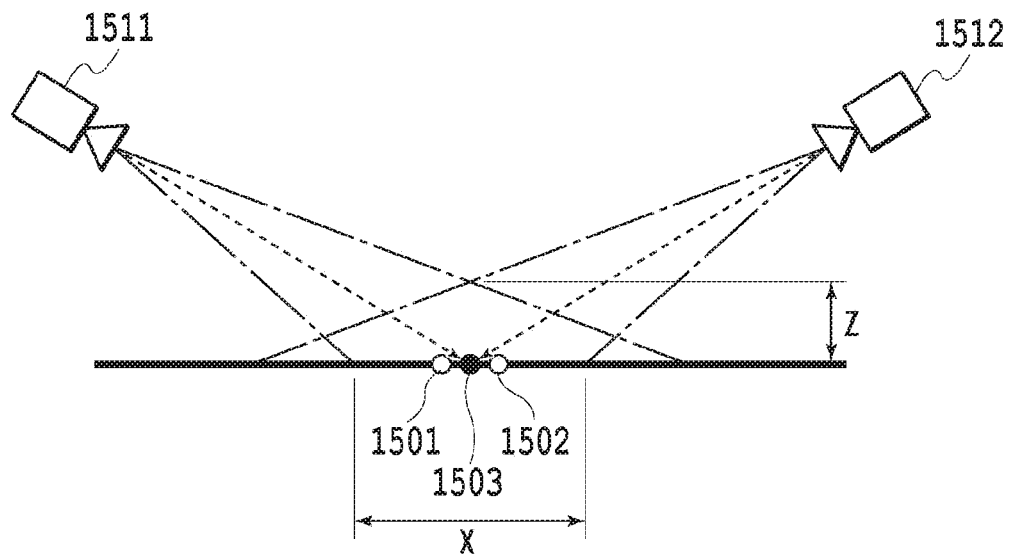
FIG. 15A and FIG. 15B are diagrams explaining the way an image capturing area for each camera group changes.
Figure 15B:
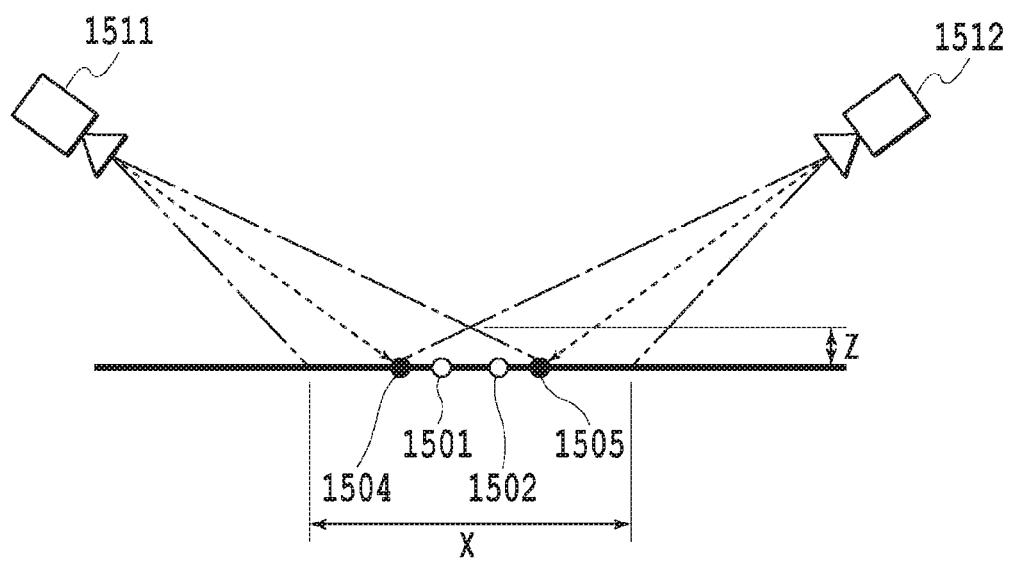

At step 1403, the distance between gaze points is reduced (or the gaze point of each camera within the group is made the same) in units of groups while keeping fixed the position of each camera belonging to the zoom camera group 109 and the standard camera group 110. At step 1404, the distance between gaze points is increased (or maintained) in units of groups while maintaining the position of each camera belonging to the zoom camera group 109 and the standard camera group 110. FIG. 15A and FIG. 15B are diagrams explaining the way the standard camera group image capturing area and the zoom camera group image capturing area change by adjusting the distance between gaze points in units of groups of each camera group. FIG. 15A is an explanatory diagram in the case where the distance between gaze points is reduced to the minimum (the gaze points are changed to the same gaze point). In FIG. 15A, two white circular marks 1501 and 1502 indicate the gage points before the change of two cameras 1511 and 1512, respectively. Then, one black circular mark 1503 indicates the gaze point after the change and both of the two cameras 1511 and 1512 face the same gaze point. In this case, a camera group image capturing area X along the field surface becomes narrow, but a camera group image capturing area Z in the height direction becomes wider than that before the change. Because of this, the image capturing area becomes an image capturing area suitable to image capturing of a ball game and the like in which a ball reaches a high altitude. In contrast to this, FIG. 15B is an explanatory diagram in the case where the distance between gaze points is increased. In FIG. 15B, a black circular mark 1504 indicates the gaze point after the change of the camera 1511 and a black circular mark 1505 indicates the gaze point after the change of the camera 1512, respectively, and it is known that the interval between the gaze points is increased. In this case, the camera group image capturing area X along the field surface becomes wide, but the camera group image capturing area Z in the height direction becomes narrow. Because of this, for a short-distance race and the like of the athletic sports, it is possible to capture an image of a wide range in parallel to the field surface.

The above is the contents of the processing to optimize the image capturing areas of the standard camera group and the zoom camera group according to the present embodiment. In the present embodiment, a single predetermined altitude is taken as a reference (threshold value) and the distance between gaze points is reduced in the case where the altitude is higher than or equal to the predetermined altitude and the distance between gaze points is increased (or maintained) in the case where the altitude is lower than the predetermined altitude, but this not limited. For example, it may also be possible to separately provide a threshold value in the case where the distance between gaze points is reduced and a threshold value in the case where the distance between gaze points is increased, respectively. Due to the present processing, it is possible to reduce the number of cameras necessary for image capturing of one game. Further, it is also possible to expect improvement of convenience, such as capturing images of another game at the same time by using the unused cameras.

According to the present embodiment, it is possible to optimize the image capturing area of the camera group other than the wide-angle camera group in accordance with the image capturing scene. Due to this, it is made possible to further reduce the video images transfer time and the processing time.

Third Embodiment

Following the above, an aspect is explained as a third embodiment, in which setting relating to a virtual camera is performed automatically by using a database. Explanation of the contents in common to those of the first and second embodiments is omitted and in the following, different points are explained mainly.

Figure 16:
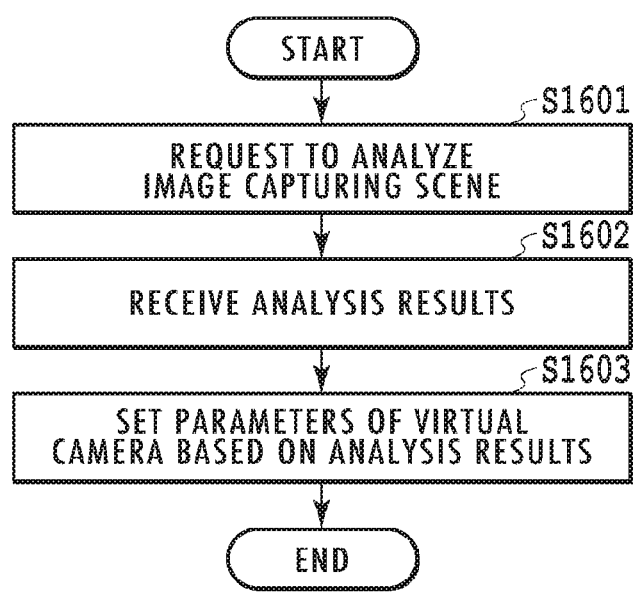
FIG. 16 is a flowchart showing details of processing to automatically set various items of a virtual camera according to a third embodiment.

FIG. 16 is a flowchart showing details of processing to automatically set various items of a virtual camera, which is performed in place of step 604 in the flow in FIG. 6 described previously according to the present embodiment.

Figure 17:
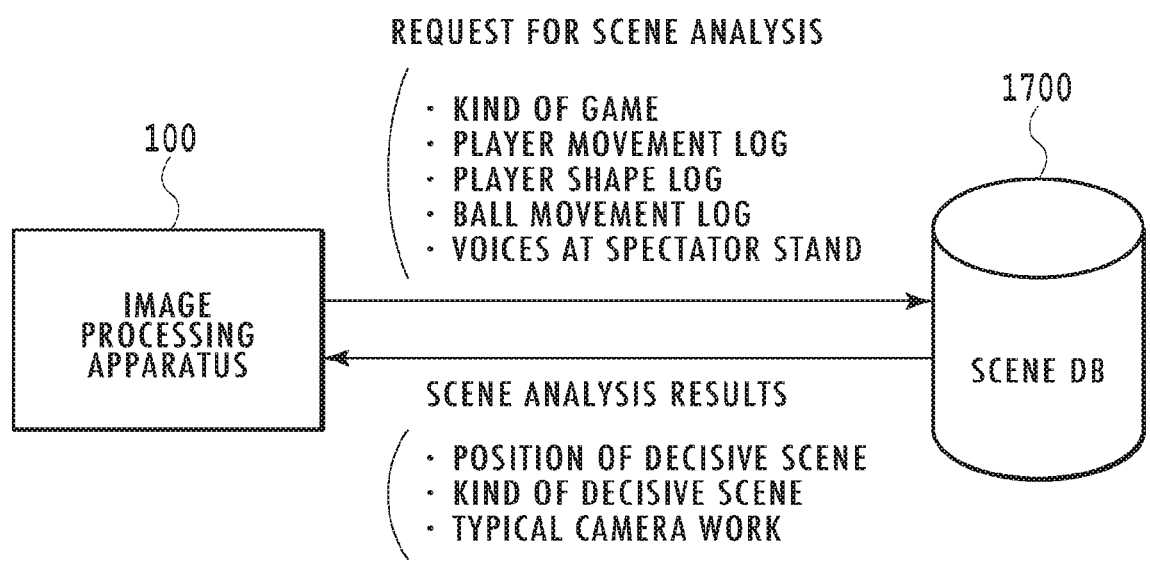
FIG. 17 is a conceptual diagram of scene analysis processing.

At step 1601, a request to analyze an image capturing scene is made to an image capturing scene analysis database (hereinafter, "scene DB") connected via an external network, not shown schematically. The image processing apparatus 100 is connected with the scene DB via the LAN 108 and the scene DB is further installed on a network that can be connected from the outside. The scene DB accumulates various pieces of information relating to image capturing scenes in the past, and receives information necessary for the analysis from the image processing apparatus 100 and performs the analysis processing of an image capturing scene. FIG. 17 is a conceptual diagram of scene analysis processing. In a scene DB 1700, for each kind of image capturing scene, object transition information and image capturing environment information are recorded. Here, the object transition information includes, for example, in the case where the image capturing scene is a match of a sports game, data recording the movement locus of a player, data recording the locus of changes in the shape of a player, and further, in the case where the image capturing scene is a ball game, data recording the movement locus of a ball, and so on. The image capturing environment information is data recording the peripheral environment, for example, voices at the spectator stand, at the time of image capturing. In the decisive scene of a sports game, the volume at the spectator stand increases due to cheers, and therefore, it is possible to make use of the data to determine whether or not the scene is a decisive scene in which the viewers are greatly interested. Further, in the case where the image capturing scene is a match of a sports game, in the scene DB 1700, information (hereinafter, decisive scene information) indicating a correspondence relationship between the above-described object transition information and image capturing environment information, and the decisive scene in each game is also recorded. The decisive scene information includes the kind of decisive scene and the typical camera work (moment path of the virtual camera) suitable to the decisive scene. The kind of decisive scene is, for example, in the case of soccer, a shoot scene, a long-pass scene, a corner-kick scene, and so on. It is possible to store the decisive scene information as learning data and to analyze the image capturing scene by using the deep learning technique and the like. It is possible to acquire the materials of the learning data from the stadiums all over the world via the Internet and the like, and therefore, it is possible to collect tremendously large data. The image processing apparatus 100 transmits the kind of image capturing scene (game), the movement log (movement locus data) of a player and ball, the shape log (shape change data) of a player, and the spectator stand voice data to the scene DB 1700 and makes a request for analysis. The above-described data that is transmitted to the scene DB 1700 is generated based on the multi-viewpoint video images data of the wide-angle camera group 111, which is acquired at step 602. In the scene DB 1700, upon receipt of the request for analysis, the above-described analysis processing is performed. The analysis results are sent to the image processing apparatus 100.

At step 1602, the image processing apparatus 100 receives the analysis results from the scene DB 1700. The analysis results include information on the position at which the decisive scene has occurred, the kind of decisive scene, and the typical camera work suitable to the decisive scene.

At step 1603, based on the received analysis results, various items of the virtual camera are set automatically. Specifically, the position at which the decisive scene has occurred is set as the gaze point of the virtual camera. Further, based on the typical camera work, the movement path of the virtual camera and the corresponding time frame are set. The information indicating the kind of decisive scene is added to the virtual viewpoint image after generation as metadata. This metadata is referred to at the time of the secondary utilization (input of character effect, generation of database, and so on) by a broadcasting organization.

The above is the contents of the processing to automatically set the various items of the virtual camera. It may also be possible to design the configuration so that the gaze point and the movement path of the virtual camera, which are automatically set as described above, are displayed on the GUI screen 700 described previously and a user can edit the contents thereof. Further, in the present embodiment, the scene DB 1700 is configured as a device separate from the image processing apparatus 100, but it may also be possible to integrate both the apparatus and the device into one apparatus. Alternatively, it may also be possible to separate the scene analysis function and the data saving function possessed by the scene DB 1700 of the present embodiment and to configure individual devices.

According to the present embodiment, it is possible to automatically set various items, such as the movement path, of the virtual camera by using a database. Due to this, it is possible to further reduce the processing time.

Fourth Embodiment

In the present embodiment, a video images generation method appropriate particularly in the case where a limit is imposed on the generation time of a virtual viewpoint image. As the case where a limit is imposed on the generation time, mention is made of, for example, a case where a virtual viewpoint image is generated as a replay immediately after the play, a case where a virtual viewpoint image is generated real time during sports broadcasting, and so on. Explanation of the processing that is the duplication of that of the first embodiment is omitted.

Figure 18:
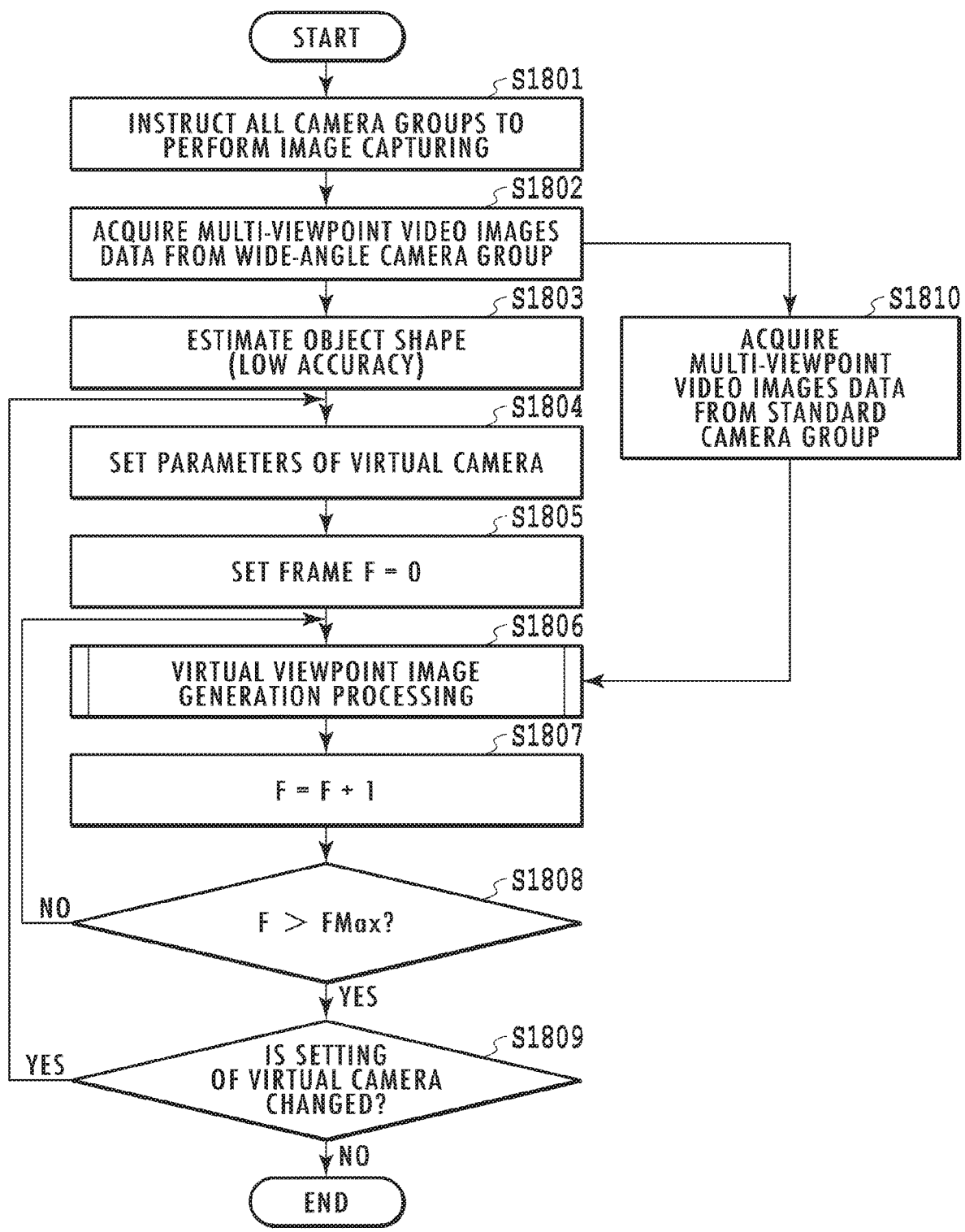
FIG. 18 is a flowchart showing an entire flow until virtual viewpoint video images are generated within a limit time according to the third embodiment.

FIG. 18 is a flowchart showing an entire flow until virtual viewpoint video images are generated within a limit time in the image processing apparatus 100. This series of processing is implemented by the CPU 101 reading a predetermined program from the storage unit 103, loading the program onto the main memory 102, and executing the program.

The processing at steps 1801 to 1809 is substantially the same as that at steps 601 to 609. The difference from FIG. 6 is step 1806 and step 1810. After the multi-viewpoint video images data is acquired from the wide-angle camera group at step 1802, in parallel to steps 1803 to 1805, step 1810 is performed. At step 1810, in order to make effective use of the communication band of the LAN 108 having completed communication, the multi-viewpoint video images data of the standard camera group is acquired sequentially. The acquired multi-viewpoint video images data is used at step 1806. Virtual viewpoint image generation processing at step 1806 will be described in detail in FIG. 19.

The above is the rough flow until the virtual viewpoint image is generated according to the present embodiment. There is an effect that the total processing time is reduced considerably by performing the data communication whose processing time is long in parallel to the shape estimation processing and the virtual camera parameter setting processing. It may also be possible to use the configuration of the present embodiment in the case where no limit is imposed on the generation time of a virtual viewpoint image or the case where there is much time for generation.

Figure 19:
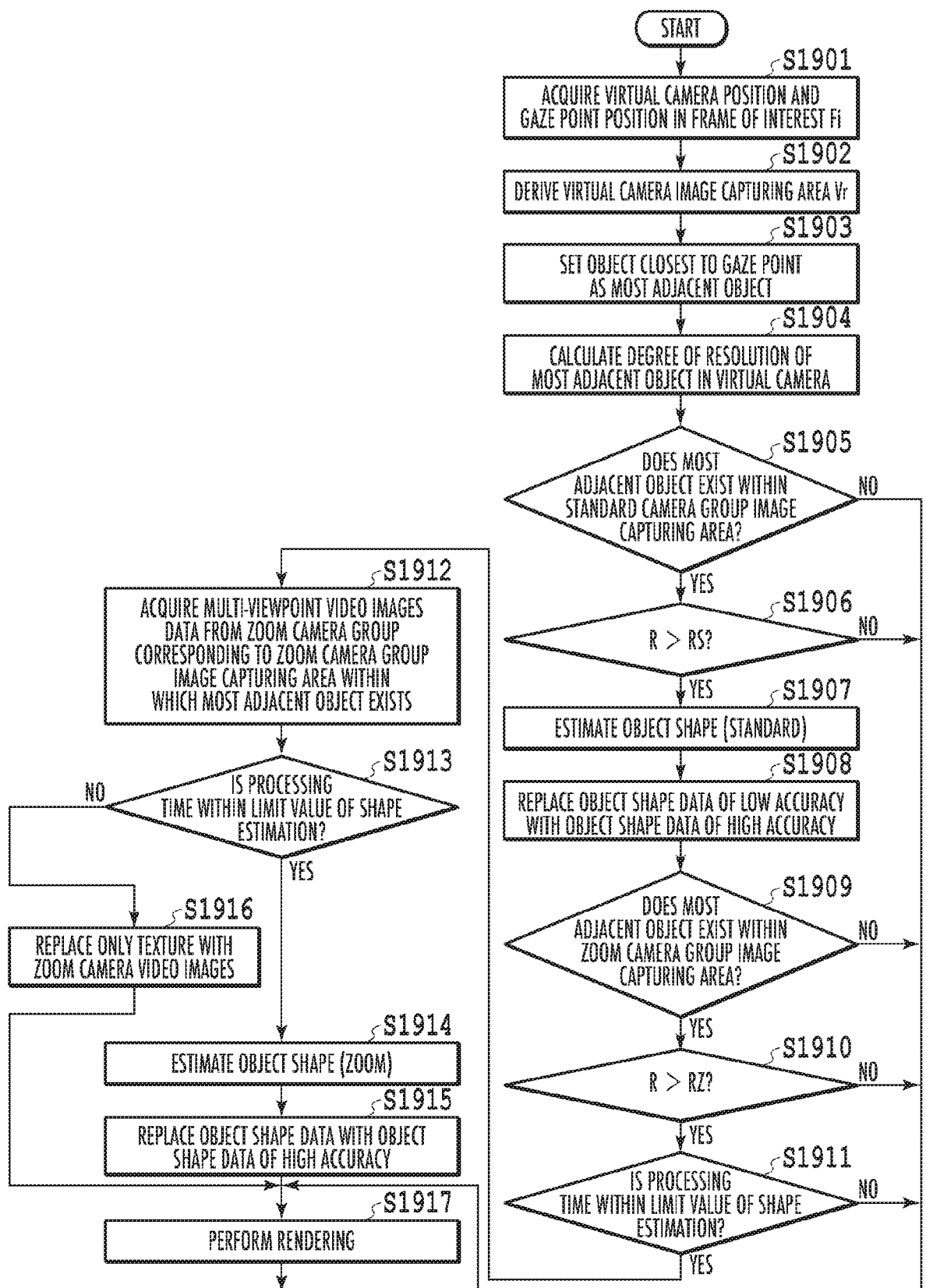
FIG. 19 is a flowchart showing details of virtual viewpoint image generation processing according to the third embodiment.

The virtual viewpoint image generation processing at step 1806 in FIG. 18 is explained. Here, after an object shape is generated by using the multi-viewpoint video images data of the standard camera group, while taking into consideration the processing time, the multi-viewpoint video images data of the zoom camera group is applied. FIG. 19 is a flowchart showing details of the virtual viewpoint image generation processing according to the present embodiment. In the following, detailed explanation is given along the flow in FIG. 19.

The processing at step 1901 to step 1906 is the same as that at steps 801 to 806, and therefore, explanation thereof is omitted. At step 1907, the reestimation processing of the object shape is performed by using the multi-viewpoint video images data of the standard camera group, which is acquired at step 1810. At step 1908, the object shape data of low accuracy obtained by the shape estimation at step 603 described previously is replaced with the object shape data of high accuracy obtained by the shape estimation at step 1907. The processing at steps 1909 and 1910 is the same as that at steps 807 and 808. At step 1911, whether the processing time up to this step is within a limit value of the execution of shape estimation is determined. The limit value is determined in advance based on the time within which the shape estimation of one image frame needs to be performed. For example, in the case where 600-frame video images for a replay are generated within 30 sec, it is possible to take the limit value to be 50 ms (30,000/600) per image frame. However, in the case where much time is given to the processing or in other circumstances, the limit value may be a different value. In the case of Yes, the processing advances to step 1912. In the case of No, the processing advances to step 1917 and then a virtual viewpoint image using the standard camera group is generated. That is, in the case where the determination results in No at step 1911, the shape estimation based on the multi-viewpoint video images data of the zoom camera group is not performed irrespective of the evaluation results of the object shape data replaced at step 1908. At step 1912, as at step 809, the multi-point video images data is acquired from the zoom camera group. At this time, in order to secure the communication band of the LAN 108, the acquisition of the multi-viewpoint video images data of the standard camera group at step 1810 is suspended temporarily and the acquisition is resumed after this step is completed. At step 1913, whether the processing time up to this step is within the limit value of the execution of shape estimation is determined again. In the case of Yes, the processing advances to step 1914 and in the case of No, the processing advances to step 1916. At step 1914, the reestimation processing of the object shape is performed by using the multi-viewpoint video images data of the zoom camera group. At step 1915, the object shape data obtained by the shape estimation at step 1907 described previously is replaced with the object shape data of high accuracy obtained by the shape estimation at step 1914. At step 1916, the reexecution time of shape estimation is short, and therefore, as the object shape, the data obtained at step 1907 is used, but rendering setting is performed so that the multi-viewpoint video images data of the zoom camera is used as a texture that is projected onto the object shape. At step 1917, by using the object shape determined by the processing up to step 1916 and the texture, a virtual viewpoint image, which is an image viewed from the virtual cameral of the frame of interest Fi, is generated.

The timing at which whether or not the processing time is within the limit value of the shape estimation is determined is not limited to the example shown in FIG. 19. For example, it may also be possible to perform the determination between step 1906 and step 1907 or to perform the determination between step 1908 and step 1909. Further, the order of step 1910 and step 1911 in FIG. 19 may be opposite.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-253280, filed Dec. 27, 2016, and No. 2017-204420, filed Oct. 23, 2017, which are hereby incorporated by reference wherein in their entirety.

What is claimed is:

1. A virtual viewpoint image generation apparatus comprising:
one or more memories that store a set of instructions;
one or more processors that execute the instructions to:
obtain a plurality of first images which are images based on capturing a first area including a predetermined area using a plurality of first image capturing devices from a plurality of directions,
obtain a plurality of second images which are images based on capturing a second area including the predetermined area using a plurality of second image capturing devices from a plurality of directions, wherein a resolution of an image corresponding to the predetermined area in at least one of the second images is higher than a resolution of an image corresponding to the predetermined area in at least one of first images;
set a position and direction of a virtual viewpoint;
generate, based on at least one of the obtained first images, a first virtual viewpoint image corresponding to the position and direction of the virtual viewpoint which are set;
determine whether or not to generate a second virtual viewpoint image based on at least one of the obtained second images and corresponding to the position and direction of the virtual viewpoint which are set, based on at least an evaluation of an image quality of an image corresponding to the predetermined area in the first virtual viewpoint image; and
generate the second virtual viewpoint image in a case where to generate the second virtual viewpoint image is determined.

2. The apparatus according to claim 1, wherein the evaluation is based on an image quality of an object region, which corresponds to a specific object in the predetermined area, included in the first virtual viewpoint image.

3. The apparatus according to claim 2, wherein the one or more processors execute the instructions to:
determine a size of the object region included in the first virtual viewpoint image as the evaluation;
determine to generate the second virtual viewpoint image in a case where the size of the object region is larger than a threshold value; and
determine not to generate the second virtual viewpoint image in a case where the size of the object region is smaller than the threshold value.

4. The apparatus according to claim 2, wherein
the specific object is an object closest to the position of the virtual viewpoint among one or more objects in the predetermined area.

5. The apparatus according to claim 2, wherein
the image quality is
determined based on a ratio between a number of pixels of the object region included in the first virtual viewpoint image and a number of total pixels of the first virtual viewpoint image.

6. The apparatus according to claim 2, wherein the second area is part of the first area.

7. The apparatus according to claim 6, wherein the first area includes an entire field.

8. The apparatus according to claim 2, wherein the one or more processors execute the instructions to:
determine, in a case where a ratio of a number of pixels of the object region included in the first virtual viewpoint image to a number of total pixels in the first virtual viewpoint image is larger than a threshold value, to generate the second virtual viewpoint image corresponding to the position and direction of the virtual viewpoint which are set; and
determine, in a case where the ratio is smaller than the threshold value, not to generate the second virtual viewpoint image.

9. The apparatus according to claim 2,
wherein the specific object is a person, and
wherein
the image quality is determined based on recognition result of a face of the person.

10. The apparatus according to claim 2, wherein the specific object is an object corresponding to the object region closest to a center of the first virtual viewpoint image among one or more object regions, which correspond to one or more objects in the predetermined area, included in the first virtual viewpoint image.

11. The apparatus according to claim 2, wherein the object region corresponding to the specific object is a region selected by a user among one or more object regions, which correspond to one or more objects in the predetermined area, included in the first virtual viewpoint image.

12. The apparatus according to claim 1, wherein
a number of the plurality of first image capturing devices is smaller than a number of the plurality of second image capturing devices.

13. The apparatus according to claim 1, wherein the one or more processors further execute the instructions to:
obtain a plurality of third images which are images based on capturing a third area including the predetermined area using a plurality of third image capturing devices from a plurality of direction, wherein a resolution of an image corresponding to the predetermined area in at least one of the third images is higher than a resolution of the image corresponding to the predetermined area in at least one of second images;
determine whether or not to generate a third virtual viewpoint image based on at least one of the obtained third images and corresponding to the position and direction of the virtual viewpoint which are set, based on at least an evaluation of an image quality of an image corresponding to the predetermined area in the second virtual viewpoint image; and generate the third virtual viewpoint image in a case where to generate the third virtual viewpoint image is determined.

14. The apparatus according to claim 13, wherein the one or more processors execute the instructions to:

determine, in a case where the second virtual viewpoint image has been generated within a limit time determined in advance, whether or not to generate the third virtual viewpoint image based on the evaluation of the image quality of the image corresponding to the redetermined area in the second virtual viewpoint image; and determine, in a case where the second virtual viewpoint image has not been generated within the limit time determined in advance, not to generate the third virtual viewpoint image irrespective of the evaluation of the image quality of the image corresponding to the redetermined area in the second virtual viewpoint image.

15. The apparatus according to claim 1, wherein the one or more processors execute the instructions to:

determine whether or not to generate the second virtual viewpoint image further based on a predetermined time.

16. The apparatus according to claim 1, wherein the one or more processors execute the instructions to:

determine, in a case where the first virtual viewpoint image has been generated within a predetermined time, whether or not to generate the second virtual viewpoint image based on the evaluation of the image quality of the image corresponding to the predetermined area in the first virtual viewpoint image; and determine, in a case where the first virtual viewpoint image has not been generated within the predetermined time, not to generate the second virtual viewpoint image irrespective of the evaluation of the image quality of the image corresponding to the predetermined area in the first virtual viewpoint image.

17. The apparatus according to claim 1, wherein the one or more processors further execute the instructions to:

specify a position of one or more objects existing in the first area based on the obtained first images; and map the one or more objects on a bird's-eye view showing the entire field based on the specified position of the one or more objects and display the one or more objects on a display, wherein the position and direction of the virtual viewpoint are set on the bird's-eye view.

18. A virtual viewpoint image generation method comprising:

obtaining a plurality of first images which are images based on capturing a first area including a predetermined area using a plurality of first image capturing devices from a plurality of directions, obtaining a plurality of second images which are images based on capturing a second area including the predetermined area using a plurality of second image capturing devices from a plurality of directions, wherein a resolution of an image corresponding to the predetermined area in at least one of the second images is higher than a resolution of an image corresponding to the predetermined area in at least one of first images;

setting a position and direction of a virtual viewpoint;

generating, based on at least one of the obtained first images, a first virtual viewpoint image corresponding to the position and direction of the virtual viewpoint which are set;

determining whether or not to generate a second virtual viewpoint image based on at least one of the obtained second images and corresponding to the position and direction of the virtual viewpoint which are set, based on at least an evaluation of an image quality of an image corresponding to the predetermined area in the first virtual viewpoint image; and generating the second virtual viewpoint image in a case where to generate the second virtual viewpoint image is determined.

19. A non-transitory computer readable storage medium storing a program for causing a computer to perform a virtual viewpoint image generation method, the method comprising:

obtaining a plurality of first images which are images based on capturing a first area including a predetermined area using a plurality of first image capturing devices from a plurality of directions, obtaining a plurality of second images which are images based on capturing a second area including the predetermined area using a plurality of second image capturing devices from a plurality of directions, wherein a resolution of an image corresponding to the predetermined area in at least one of the second images is higher than a resolution of an image corresponding to the predetermined area in at least one of first images;

setting a position and direction of a virtual viewpoint;

generating, based on at least one of the obtained first images, a first virtual viewpoint image corresponding to the position and direction of the virtual viewpoint which are set;

determining whether or not to generate a second virtual viewpoint image based on at least one of the obtained second images and corresponding to the position and direction of the virtual viewpoint which are set, based on at least an evaluation of an image quality of an image corresponding to the predetermined area in the first virtual viewpoint image; and generating the second virtual viewpoint image in a case where to generate the second virtual viewpoint image is determined.

* * * * *